(12) United States Patent
Widmer et al.

(10) Patent No.: US 7,339,953 B2
(45) Date of Patent: *Mar. 4, 2008

(54) SURPLUS REDISTRIBUTION FOR QUALITY OF SERVICE CLASSIFICATION FOR PACKET PROCESSING

(75) Inventors: Robert F. Widmer, Odenton, MD (US); Suhail Nanji, Coconut Creek, FL (US); Nicholas M. Thille, San Luis Obispo, CA (US)

(73) Assignee: Redback Networks, Inc., San Jose, CA (US)

( * ) Notice: Subject to any disclaimer, the term of this patent is extended or adjusted under 35 U.S.C. 154(b) by 1064 days.

This patent is subject to a terminal disclaimer.

(21) Appl. No.: 10/281,856

(22) Filed: Oct. 28, 2002

(65) Prior Publication Data

US 2004/0042484 A1 Mar. 4, 2004

Related U.S. Application Data

(60) Provisional application No. 60/407,315, filed on Aug. 30, 2002.

(51) Int. Cl.
*H04J 3/18* (2006.01)
(52) U.S. Cl. ..................................... 370/477
(58) Field of Classification Search ........ 370/229–235, 370/395.41, 395.42, 400, 412, 468, 477, 370/493
See application file for complete search history.

(56) References Cited

U.S. PATENT DOCUMENTS

| 5,509,006 | A | 4/1996 | Wilford et al. |
|---|---|---|---|
| 5,850,399 | A | 12/1998 | Ganmukhi et al. |
| 5,905,730 | A | 5/1999 | Yang et al. |
| 6,018,527 | A * | 1/2000 | Yin et al. ............... 370/395.41 |
| 6,091,709 | A | 7/2000 | Harrison et al. |
| 6,104,700 | A | 8/2000 | Haddock et al. |
| 6,134,217 | A | 10/2000 | Stiliadis et al. |
| 6,188,698 | B1 | 2/2001 | Galand et al. |

(Continued)

FOREIGN PATENT DOCUMENTS

WO   WO 98/26510   6/1998

(Continued)

OTHER PUBLICATIONS

Goyal, Pawan et al., Start-Time Fair Queueing: A Scheduling Algorithm for Integrated Services Packet Switching Networks, IEEE/ACM Transactions on Networking, vol. 5, No. 5, Oct. 1997.

(Continued)

*Primary Examiner*—Dmitry Levitan
(74) *Attorney, Agent, or Firm*—Blakely, Sokoloff, Taylor & Zafman, LLP

(57) ABSTRACT

In one embodiment, a method comprises outputting data from a queue of a number of queues of an egress port. The queue has a portion of an allocated bandwidth for the egress port for a processing cycle, wherein the number of queues are associated with nodes of a port tree. The method also includes redistributing surplus of the portion of bandwidth for the queue that is not used to at least one other queue. The surplus is added to a portion of the allocated bandwidth for the at least one other queue for the processing cycle.

19 Claims, 15 Drawing Sheets

U.S. PATENT DOCUMENTS

| | | |
|---|---|---|
| 6,229,812 B1 | 5/2001 | Parruck et al. |
| 6,407,999 B1 | 6/2002 | Olkkonen et al. |
| 6,408,006 B1 | 6/2002 | Wolff |
| 6,463,470 B1 | 10/2002 | Mohaban et al. |
| 6,466,984 B1 | 10/2002 | Naveh et al. |
| 6,560,230 B1 | 5/2003 | Li et al. |
| 6,567,415 B1 | 5/2003 | Elwalid et al. |
| 6,606,302 B2 * | 8/2003 | Delattre et al. .......... 370/230.1 |
| 6,625,150 B1 | 9/2003 | Yu |
| 6,665,301 B1 * | 12/2003 | Wu ....................... 370/395.41 |
| 6,795,441 B1 | 9/2004 | Widmer et al. |
| 6,909,691 B1 | 6/2005 | Goyal et al. |
| 6,914,881 B1 | 7/2005 | Mansfield et al. |
| 6,922,732 B2 | 7/2005 | Elmaliach et al. |
| 6,967,921 B1 * | 11/2005 | Levy et al. ............... 370/230.1 |
| 2002/0122422 A1 | 9/2002 | Kenney et al. |
| 2004/0042484 A1 | 3/2004 | Widmer et al. |

FOREIGN PATENT DOCUMENTS

| | | |
|---|---|---|
| WO | WO 00/08817 | 2/2000 |
| WO | WO 00/11885 | 3/2000 |
| WO | PCT/US03/27206 | 8/2003 |
| WO | PCT/US03/27206 | 5/2004 |

OTHER PUBLICATIONS

McKenney, Paul E., "Stochastic Fairness Queuing" CH2826-5 IEEE, 1990.

Shreedhar, M. et al. "Efficient Fair Queing using Deficient Round Robin" Washington University in St. Louis, 1995.

* cited by examiner

SURPLUS REDISTRIBUTION FOR QUALITY OF SERVICE CLASSIFICATION FOR PACKET PROCESSING

CROSS-REFERENCE TO RELATED APPLICATION

This application claims the benefit of U.S. provisional patent application No. 60/407,315 entitled "Hierarchy Tree-Based Quality of Service Classification for Packet Processing," filed Aug. 30, 2002.

FIELD OF THE INVENTION

The invention relates to the field of communications. More specifically, the invention relates to surplus redistribution for quality of service classification for packet processing.

BACKGROUND OF THE INVENTION

Maintaining efficient flow of information over data communication networks is becoming increasingly important in today's economy. Communications networks are evolving toward a connectionless model from a model whereby the networks provide end-to-end connections between specific points. In a network which establishes specific end-to-end connections to service the needs of individual applications, the individual connections can be tailored to provide a desired bandwidth for communications between the end points of the connections. This is not possible in a connectionless network. The connectionless model is desirable because such a model saves the overhead implicit in setting up connections between pairs of endpoints and also provides opportunities for making more efficient use of the network infrastructure through statistical gains. Many networks today provide connectionless routing of data packets, such as Internet Protocol ("IP") data packets, over a network which includes end-to-end connections for carrying data packets between certain parts of the network. The end-to-end connections may be provided by technologies such as Asynchronous Transfer Mode ("ATM"), Time Division Multiplexing ("TDM") and Synchronous Optical Network (SONET) and Synchronous Digital Hierarchy (SDH).

A Wide Area Network ("WAN") is an example of a network used to provide interconnections capable of carrying many different types of data between geographically separated nodes. For example, the same WAN may be used to transmit video images, voice conversations, e-mail messages, data to and from database servers, and so on. Some of these services place different requirements on the WAN.

A typical WAN comprises a shared network which is connected by access links to two or more geographically separated customer premises. Each of the customer premises may include one or more devices connected to the network. More typically, each customer premise has a number of computers connected to a local area network ("LAN"). The LAN is connected to the WAN access link at a service point. The service point is generally at a "demarcation" unit or "interface device" which collects data packets from the LAN which are destined for transmission over the WAN and sends those packets across the access link. The demarcation unit also receives data packets coming from the WAN across the access link and forwards those data packets to destinations on the LAN. One type of demarcation unit may be termed an ESP (Enterprise Service Point).

A network service is dependent on the amount of data it can send and receive from a source device to one or more destination devices. Therefore, the quality of a network service is dependent on the amount of network resources (such as uptime, outages, bandwidth, delay, loss, and jitter) the network can utilize to transfer its data. However, in a conventional IP network, all network services share all the network resources on a first come, first serve ("best effort") basis. This may be detrimental to some network services since some services require more network resources than other services.

For example, a typical video conferencing service requires much more data to be sent than a typical e-mail service. Transmitting a video signal for a videoconference requires fairly large bandwidth, short delay (or "latency"), small jitter, and reasonably small data loss ratio. An e-mail service requires far less network resources than a video conferencing service because the e-mail service often has relatively little data to send to its destinations and it is generally acceptable if an e-mail transmission is slightly delayed in transiting a network. Transmitting e-mail messages or application data can generally be done with lower bandwidth but can tolerate no data loss. Furthermore, it is not usually critical that e-mail be delivered instantly, so e-mail services can usually tolerate longer latencies and lower bandwidth than other services. In addition, the e-mail service requires only enough network resources to send data in a single direction. Conversely, the typical video conferencing service requires enough network resources to send data constantly and seamlessly in two directions. This may be required if all participants in the video conference want to see each other, and thus requires an individual's image to be sent to the other participants and the other participant's images to be received.

If the network resources are shared in a best effort fashion between these and other types of network services, the e-mail service will deliver e-mail extremely fast, but the video conferencing service would not be able to display a very clear picture. What is desired is to have a policy where the network resources utilization is weighted such that the video conferencing service receives more network resources than e-mail services.

Typically, an enterprise which wishes to link its operations by a WAN obtains an unallocated pool of bandwidth for use in carrying data over the WAN. While it is possible to vary the amount of bandwidth available in the pool (by purchasing more bandwidth on an as-needed basis), there is no control over how much of the available bandwidth is taken by each application.

Again, guaranteeing the Quality of Service ("QoS") needed by applications which require low latency is typically done by dedicating end-to-end connection-oriented links to each application. This tends to result in an inefficient allocation of bandwidth. Network resources which are committed to a specific link are not readily shared, even if there are times when the link is not using all of the resources which have been allocated to it. Thus committing resources to specific end-to-end links reduces or eliminates the ability to achieve statistical gains. Statistical gains arise from the fact that it is very unlikely that every application on a network will be generating a maximum amount of network traffic at the same time.

If applications are not provided with dedicated end-to-end connections but share bandwidth, then each application can, in theory, share equally in the available bandwidth. In practice, however, the amount of bandwidth available to each application depends on things such as router configuration, the location(s) where data for each application enters the network, the speeds at which the application can generate the data that it wishes to transmit on the network and so on. The result is that bandwidth may be allocated in a manner that bears no relationship to the requirements of individual applications or to the relative importance of the applications. There are similar inequities in the latencies in the delivery of data packets over the network.

The term "Quality of Service" is used in various different ways. In general, QoS refers to a set of parameters which describe the required traffic characteristics of a data connection. The term "QoS" generally refers to a set of one or more of the following interrelated parameters which describe the way that a data connection treats data packets generated by an application: a minimum bandwidth, a maximum delay, a maximum loss and jitter. A minimum bandwidth is a minimum rate at which a data connection should be capable of forwarding data originating from the application. The data connection might be incapable of forwarding data at a rate faster than the minimum bandwidth but should be capable of forwarding data at a rate equal to the rate specified by the minimum bandwidth. The maximum delay is a maximum time taken for data from an application to completely traverse the data connection. QoS requirements are met only if data packets traverse the data connection in a time equal to or shorter than the maximum delay. The maximum loss is a maximum fraction of data packets from the application which may not be successfully transmitted across the data connection. Jitter is a measure of how much variation there is in the delay experienced by different packets from the application being transmitted across the data connection. In an ideal case, where all packets take exactly the same amount of time to traverse the data connection, the jitter is zero. Jitter may be defined, for example, as any one of various statistical measures of the width of a distribution function which expresses the probability that a packet will experience a particular delay in traversing the data connection. Different applications require different levels of QoS.

Recent developments in core switches for WANs have made it possible to construct WANs capable of quickly and efficiently transmitting vast amounts of data. There is a need for a way to provide network users with control over the QoS provided to different data services which may be provided over the same network.

Service providers who provide access to WANs wish to provide their customers with "Service Level Agreements" rather than raw bandwidth. A Service Level Agreement is an agreement between a service provider and a customer that defines the level of service that will be provided for each particular type of application. This will permit the service providers to take advantage of statistical gain to more efficiently use the network infrastructure while maintaining levels of QoS that customers require. To do this, the service providers need a way to manage and track usage of these different services.

Applications connected to a network generate packets of data for transmission on the network. In providing different levels of service it is necessary to be able to sort or "classify" data packets from one or more applications into different classes which will be accorded different levels of service. The data packets can then be transmitted in a way which maintains the required QoS for each application. Data packets generated by one or more applications may belong to the same class.

SUMMARY OF THE INVENTION

A method and apparatus for surplus redistribution for quality of service classification for packet processing are described. In one embodiment, a method comprises outputting data from a queue of a number of queues of an egress port. The queue has a portion of an allocated bandwidth for the egress port for a processing cycle, wherein the number of queues are associated with nodes of a port tree. The method also includes redistributing surplus of the portion of bandwidth for the queue that is not used to at least one other queue. The surplus is added to a portion of the allocated bandwidth for the at least one other queue for the processing cycle.

In an embodiment, a network element comprises a traffic card that includes an egress port. The egress port is to include a number of egress queues to store a number of data packets. The network element also includes a forwarding card that includes a memory to store a port tree having a context level of nodes, wherein each node at the context level is associated with a different context for the number of data packets. The forwarding card also includes a forwarding engine to output data packets from the number of egress queues based on a bandwidth for the egress port. The bandwidth allocated across the different egress queues based on the port tree, wherein the forwarding engine is to redistribute a surplus of allocated bandwidth for an egress queue that is not used during a current processing cycle to at least one other queue for the current processing cycle.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings.

DETAILED DESCRIPTION

A method and apparatus for surplus redistribution for quality of service classification for packet processing are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
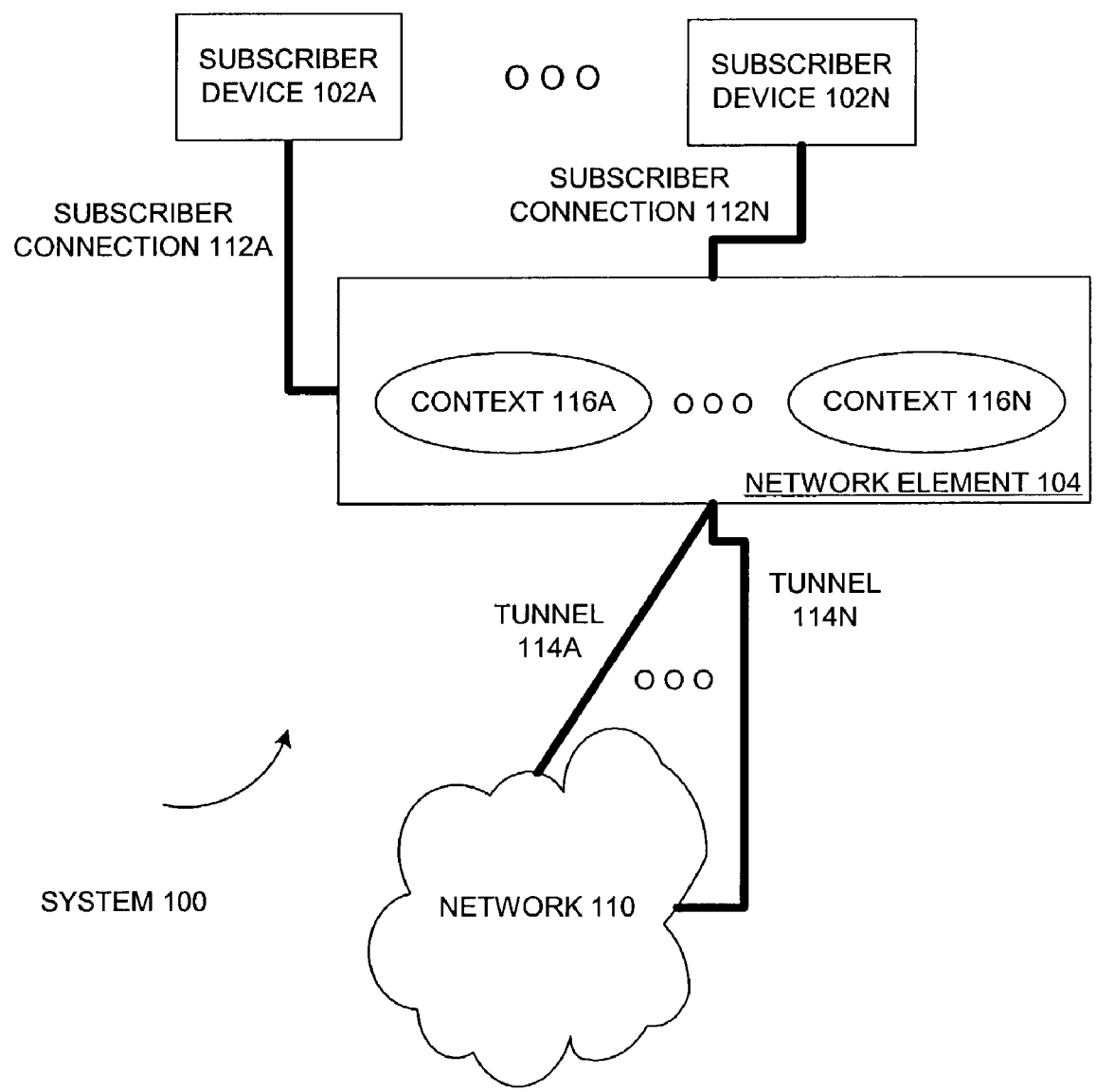
FIG. 1 illustrates a system for using a hierarchy tree in quality of service classification for packet processing, according to one embodiment of the invention.
Figure 2:
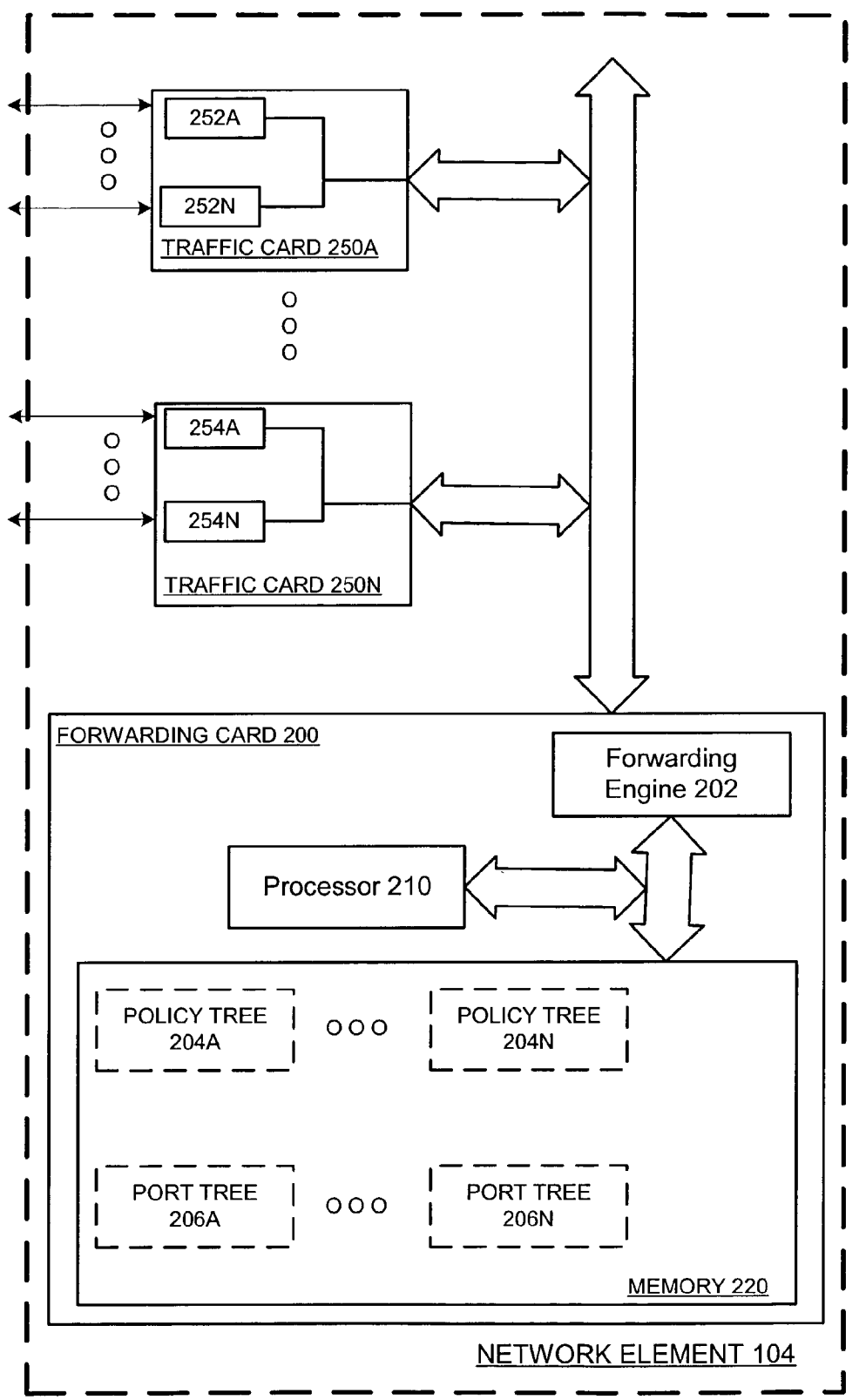
FIG. 2 illustrates a block diagram of a network element, according to an embodiment of the invention.
Figure 3:
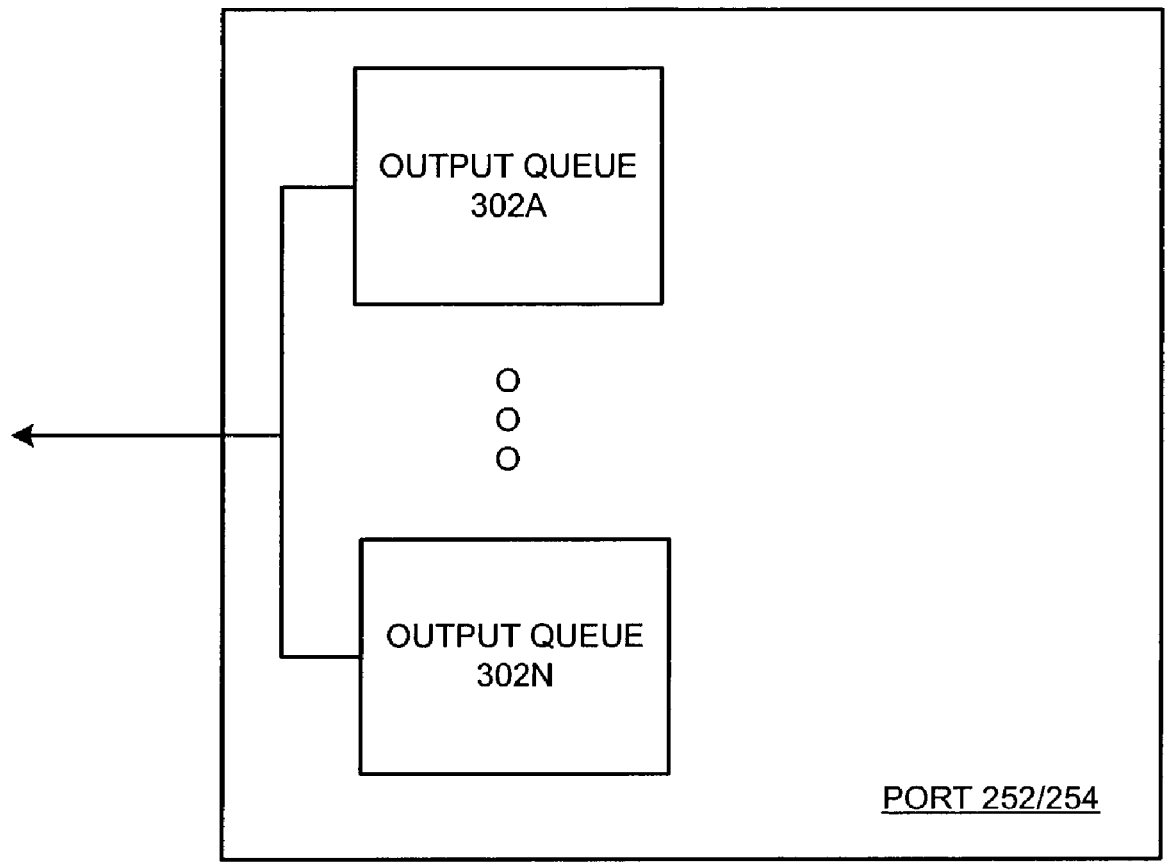
FIG. 3 illustrates a more detailed block diagram of a port on a traffic card, according to one embodiment of the invention.

FIGS. 1-3 show block diagrams of systems and apparatus for hierarchy tree-based quality of service classification for packet processing, in accordance with embodiments of the invention. FIGS. 4, 6, 8-9 and 11 show flow diagrams illustrating operations for hierarchy tree-based quality of service classification for packet processing, according to embodiments of the invention. The operations of the flow diagram will be described with references to the systems shown in the block diagrams. However, it should be understood that the operations of the flow diagram could be performed by embodiments of systems and apparatus other than those discussed with reference to the block diagrams, and embodiments discussed with reference to the systems could perform operations different than those discussed with reference to the flow diagram.

One aspect of the invention is the processing and storage of data packets into a number of different output queues based on a hierarchy tree-based quality of service classification, that are to be subsequently outputted from a number of different ports of a network element. Another aspect of the invention is the allocation of bandwidth for the outputting of the data packets from the output queues based on a hierarchy tree-based quality of service classification. While these two aspects can be used together, they are independent of each other. In other words, the outputting of the data packets from the output queues as described herein can be used irrespective of the method employed for the storage of the data packets into the different output queues; and vice versa. In one embodiment, the hierarchy tree comprises a number of different levels that are associated with a number of different attributes of the data packets being processed. In one embodiment, an attribute associated with the packet that is part of a level of such a hierarchy tree includes a context, which is described in more detail below. In an embodiment, an attribute associated with the packet that is part of a level of such a hierarchy tree includes a tunnel that the packet traverses through the network. In one embodiment, an attribute associated with the packet that is art of a level of such a hierarchy tree includes a subscriber from which the packet originated.

FIG. 1 illustrates a system for using a hierarchy tree in quality of service classification for packet processing, according to one embodiment of the invention. As will be described in more detail below, a system 100 of FIG. 1 illustrates a system of communications that can be based on a number of protocols and configurations. In particular, the system 100 of illustrates a system of communications that can be based on a cable infrastructure, an infrastructure that employs DSL/Asynchronous Transfer Mode (ATM) and Ethernet, etc. These systems are by way of example and not by way of limitation, as other systems based on other types of protocols and having other types of configurations can incorporate embodiments of the invention. For example, embodiments of the inventions can be incorporated into a wireless infrastructure, wherein wireless concentrators can route data from client devices into the network elements described herein.

With regard to FIG. 1, the system 100 comprises a number of subscriber devices 102A-N, a network element 104 and a network 110. As shown, the subscriber devices 102A-N are coupled to the network element 104 through subscriber connection 112A-N, respectively. The network element 104 is coupled to the network 110. In one embodiment, the network element 104 is coupled to other network elements within and coupled to the network 110 through tunnels 114A-N. The tunnels 114A-N can be based on a number of different types of protocols, including, but not limited to, Layer 2 Tunneling Protocol (L2TP), Point-to-Point Tunneling Protocol (PPTP), etc.

The network element 104 includes a number of contexts 116A-N. In one embodiment, a context is a logical coupling of a number of subscribers. For example, in one embodiment, an Internet Service Provider is associated with a context. In another embodiment, subscribers being received on a given interface(s) are associated with a context. In an embodiment, subscribers having a given connection rate, bandwidth minimums and/or maximums, etc. are associated with a context.

In one embodiment, the network 110 is a local area network (LAN). In an embodiment, the network 110 is a wide area network (WAN). Further, the network 110 may be a combination of different networks that couple the network element 104 to other computing devices and network elements coupled thereto. In one embodiment, the network element 104 includes logic that enables the incorporation of a hierarchy tree into quality of service classification for packet processing. The operations of the system 100 illustrated in FIG. 1 will be described in more detail below.

FIG. 2 illustrates a block diagram of a network element, according to an embodiment of the invention. In particular, FIG. 2 illustrates a more detailed block diagram of the network element 104, according to one embodiment of the invention. As shown, the network element 104 includes traffic cards 250A-250N and a forwarding card 200. The network element 104 is not limited to the number of traffic cards shown in FIG. 2, as the network element 104 can include any of a number of different traffic cards.

In an embodiment, each of the traffic cards 250A-N include a processor and memory (not shown). The traffic cards 250A-N and the forwarding card 200 are coupled together through system buses. This coupling together of the traffic cards 250 and the forwarding card 200 is representative of a number of configurations to allow for the transferring of data packets among the different traffic cards 250. For example, in one embodiment, such system buses are representative of a mesh wherein each traffic card 250 is connected to every other traffic card 250. In another example, such system buses are representative of a configuration wherein the traffic cards 250 are coupled to the forwarding card 200. Accordingly, the data packets are received into a given traffic card 250 and transmitted to the forwarding card 200, wherein the forwarding card 200 includes a number of routing tables for forwarding the data packets to the traffic card 250 from which the data packet is to be transmitted from the network element 104.

As shown, the forwarding card 200 comprises a processor 210, a memory 220 and a forwarding engine 202. The processor 210 is coupled to the forwarding engine 202 and the memory 220. The forwarding engine 202 is coupled to the memory 220. The processor 210 may comprise any suitable processor architecture. The forwarding card 200 for other embodiments may comprise more processors any of which may execute a set of instructions that are in accordance with embodiments of the present invention. The memory 220 stores a number of policy trees 204A-N and a number of port trees 206A-N. As will be described in more detail below, the policy trees 204A-N and the port trees 206A-N are hierarchy tree data structures that are employed in the storage of data packets into egress queues across a number of ports of the traffic cards 250A-N. In an embodiment the policy trees 204A-N and the port trees 206A-N are employed in the bandwidth distribution for the different egress queues across a number of ports of the traffic cards 250A-N. In one embodiment, a given port within one of the traffic cards 250 includes an associated port tree 206. In one embodiment, a policy tree 204 is a generic data structure, instances of which are different port trees 204. Accordingly, in one embodiment, a same policy tree 204 can be used as different port trees 204 across different ports. In other words, two different ports having a same quality of service policy can have two different port trees 206 that are derived from a same policy tree. For example, in an object-oriented environment, the policy trees 204 can be classes, while the port trees can be instances of such classes. Embodiments of the port trees 206 are described in more detail below.

While FIG. 2 illustrates the policy trees 204A-N and the port trees 206A-N being stored in a memory within the forwarding card 200, embodiments of the invention are not so limited. For example, in other embodiments, the policy trees 204A-N and/or the port trees 206A-N can be stored within memories of the associated traffic cards 250A-N. The memory 220 may store also store other data and/or instructions, for example, for the forwarding card 200 and may comprise any suitable memory, such as a dynamic random access memory (DRAM) for example.

As will be described in more detail below, in one embodiment, the forwarding engine 202 provides for the storage of data packets into egress queues across a number of ports of the traffic cards 250A-N and for the outputting of data packets from such egress queues based on a hierarchy tree-based quality of service classification. While FIG. 2 illustrates one forwarding engine 202 for such processing across the number of different traffic cards 250A-N, embodiments of the invention are not so limited. In other embodiments, a number of different forwarding engines 202 within the forwarding card 200 and/or the traffic cards 250A-N perform such processing. For example, in one embodiment, each traffic card 250A-N can include a forwarding engine 202.

In an embodiment, the forwarding engine 202 is a process or task that can reside within the memory 220 and/or the processor 210 and can be executed within the processor 210. However, embodiments of the invention are not so limited, as the forwarding engine 202 can be different types of hardware (such as digital logic) executing the processing described therein (which is described in more detail below). Accordingly, the forwarding card 200 may include a machine-readable medium on which is stored a set of instructions (i.e., software) embodying any one, or all, of the methodologies described herein. For example, software can reside, completely or at least partially, within the memory 220 and/or within the processor 210.

Moreover, the forwarding card 200 provides for buffering, packet processing and forwarding of data packets being received by the traffic cards 250A-N. In particular, as shown, the traffic cards 250A-N are coupled to a number of data transmission lines, which are coupled to other network elements and/or computing devices. Accordingly, the traffic cards 250A-N receive and transmit data traffic from and to data transmission lines coupled thereto. Such data traffic is transmitted to the forwarding card 200, where this traffic can be buffered, processed and/or forwarded to other traffic cards within the network element 104, as will be described in more detail below.

Further, the traffic card 250A includes a number of ports 252A-N, while the traffic card 250N includes a number of ports 254A-N. The ports 252A-N and the ports 254A-N are representative of physical and/or logical interfaces for receiving and transmitting data into and out from the traffic card 250A and the traffic card 250N.

FIG. 3 illustrates a more detailed block diagram of a port on a traffic card, according to one embodiment of the invention. In particular, FIG. 3 illustrates a more detailed block diagram of one of the ports 252/254 on one of the traffic cards 250, according to one embodiment of the invention. As shown, the ports 252/254 comprise a number of output queues 302A-N. In one embodiment, the output queues 302 are employed for storing data packets that are to be outputted from the traffic cards 250. Such operation is described in more detail below.

Figure 4:
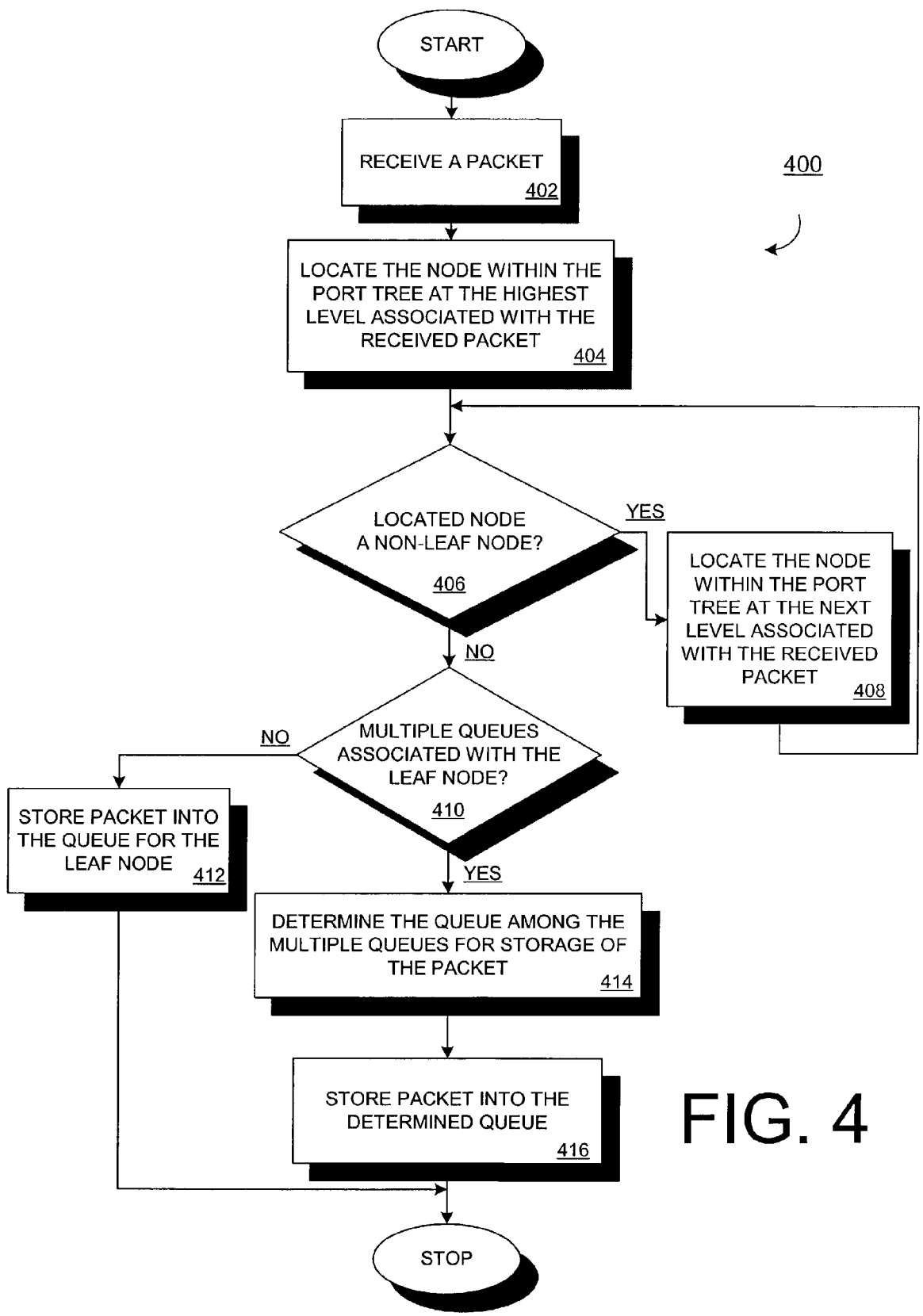
FIG. 4 illustrates a flow diagram for the storing of data packets into a number of different queues for outputting across a number of different output ports, according to one embodiment of the invention.

In particular, the operations for storing data packets into a number of different queues for outputting across a number of different output ports will now be described. In particular, FIG. 4 illustrates a flow diagram for the storing of data packets into a number of different queues for outputting across a number of different output ports, according to one embodiment of the invention. The operation of the flow diagram 400 will be described with reference to the exemplary systems shown in FIGS. 1-3.

In block 402, a packet is received. With reference to the exemplary embodiment of FIGS. 2 and 3, a first traffic card 250 receives a data packet from an external source, such as a different network element, a subscriber computing device, etc. Control continues at block 404.

In block 404, the node within the port tree (for the egress port that the packet is to be outputted from) at the highest level associated with the received packet is located. With reference to the exemplary embodiment of FIGS. 2 and 3, the forwarding engine 202 locates the node within the port tree 206 associated with the port that the data packet is to be output from. To help illustrate, assume that the data packet is received into an ingress port of the traffic card 250A. The data packet is transmitted to the forwarding card 200, wherein the forwarding engine 202 determines that the data packet is to be outputted on the egress port 254A of the traffic card 250N (based on routing tables within the forwarding card 200 (not shown)). Accordingly, the forwarding engine 202 retrieves the port tree 206 associated with the egress port 254A from memory 220. Further, the forwarding engine 202 locates the node within the port tree 206 at the highest level associated with the received packet.

Figure 5A:
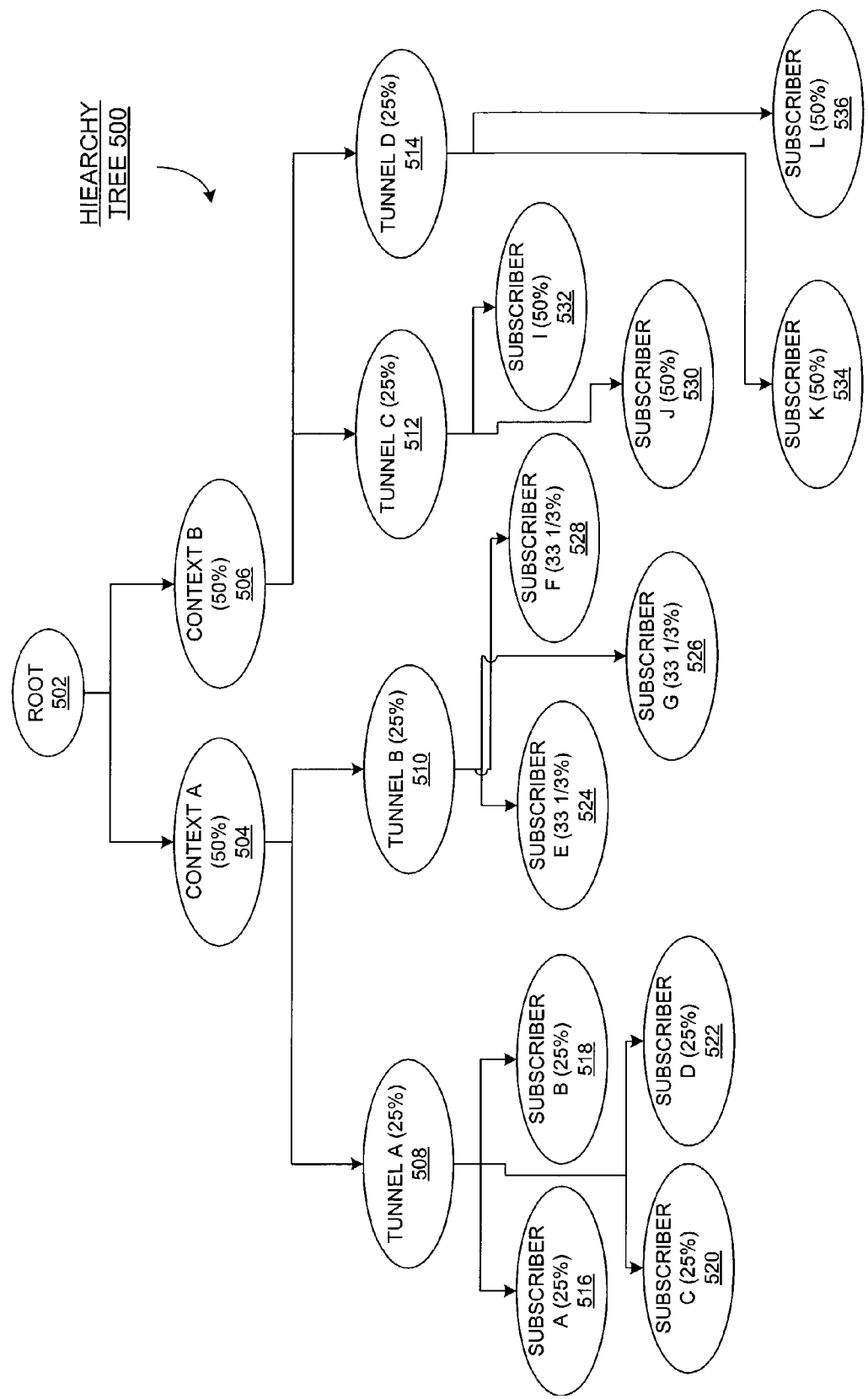
FIGS. 5A-5C illustrate hierarchy trees for quality of service classification for processing of data packets, according to one embodiment of the invention.
Figure 5B:
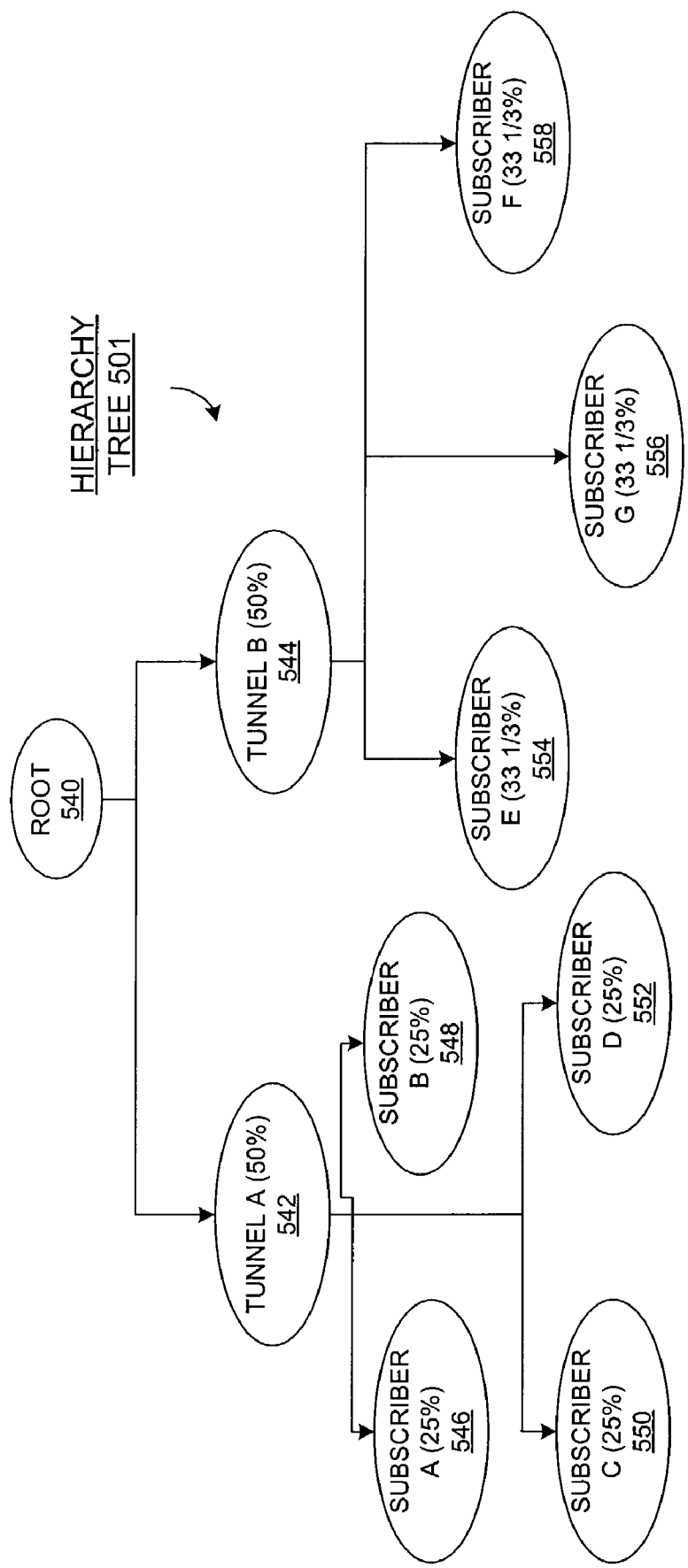
Figure 5C:
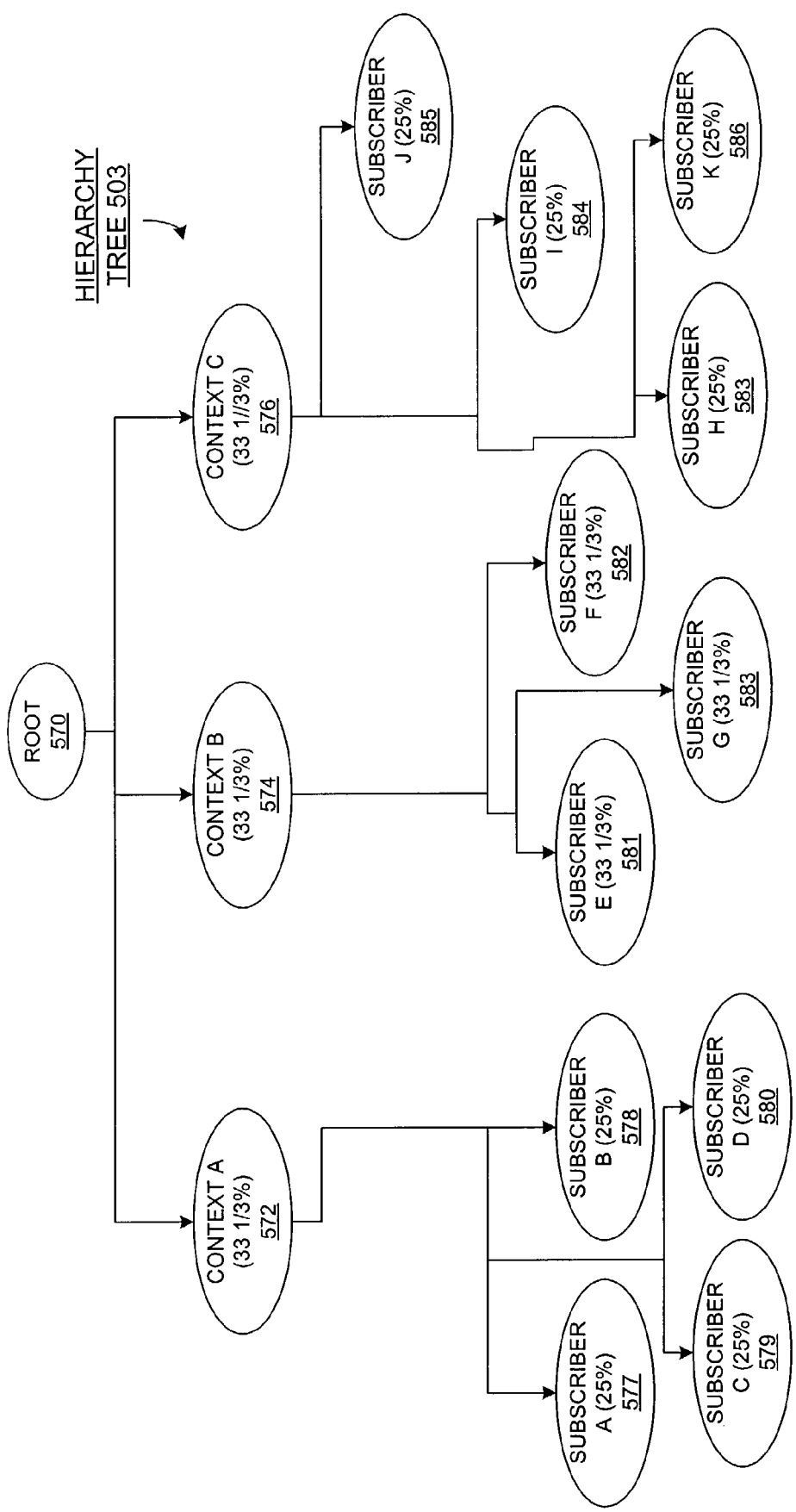

To help illustrate, FIGS. 5A-5C illustrate hierarchy trees for quality of service classification for processing of data packets, according to one embodiment of the invention. In one embodiment, the hierarchy trees illustrates in FIGS. 5A-5C are representative of the port trees 206 and the policy trees 204. As shown, FIGS. 5A-5C illustrate that such hierarchy trees are based on a combination of different attributes associated with the data packets. In one embodiment, these hierarchy trees include a level for a context of a data packet. In an embodiment, these hierarchy trees include a level for a tunnel of a data packet. In one embodiment, these hierarchy trees include a level for a subscriber of a data packet. Such attributes incorporated into the hierarchy trees are by way of example and not by way of limitation, as other attributes of the data packet can be incorporated therein. Other examples of data packet attributes that can be incorporated into the hierarchy tree include the port/interface the data packet is received, the destination of the data packet, etc. Further, as shown, the nodes of the hierarchy trees have associated percentages, which are percentages of the allocated bandwidth for the port relative to other sibling nodes. The distribution of the bandwidth and the outputting of data based on these percentages is described in more detail below.

FIG. 5A illustrates a hierarchy tree 500 that includes three levels: (1) a context level, (2) a tunnel level and (3) a subscriber level. As shown, the hierarchy tree 500 includes a root 502 that includes a number of children nodes at a context level. In particular, the root 502 includes a context A node 504 (having a bandwidth percentage of 50%) and a context B node 506 (having a bandwidth percentage of 50%). The context A node 504 includes a number of children nodes at a tunnel level. In particular, the context A node 504 includes a tunnel A node 508 (having a bandwidth percentage of 25%) and a tunnel B node 510 (having a bandwidth percentage of 25%). The context B node 506 includes a number of children nodes at the tunnel level. In particular, the context B node 506 includes a tunnel C node 512 (having a bandwidth percentage of 25%) and a tunnel D node 514 (having a bandwidth percentage of 50%).

The tunnel A node 508 includes a number of children nodes (that are leaf nodes of the hierarchy tree 500) at a subscriber level. In particular, the tunnel A node 508 includes a subscriber A node 516 (having a bandwidth percentage of 25%), a subscriber B node 518 (having a bandwidth percentage of 25%), a subscriber C node 520 (having a bandwidth percentage of 25%) and a subscriber D node 522 (having a bandwidth percentage of 25%). The tunnel B node 510 includes a number of children nodes (that are leaf nodes of the hierarchy tree 500) at the subscriber level. In particular, the tunnel B node 510 includes a subscriber E node 524 (having a bandwidth percentage of 33⅓%), a subscriber F node 528 (having a bandwidth percentage of 33⅓%) and a subscriber G node 526 (having a bandwidth percentage of 33⅓%). The tunnel C node 512 includes a number of children nodes (that are leaf nodes of the hierarchy tree 500) at the subscriber level. In particular, the tunnel C node 512 includes a subscriber I node 532 (having a bandwidth percentage of 50%) and a subscriber J node 530 (having a bandwidth percentage of 50%). The tunnel D node 514 includes a number of children nodes (that are leaf nodes of the hierarchy tree 500) at the subscriber level. In particular, the tunnel D node 514 includes a subscriber K node 534 (having a bandwidth percentage of 50%) and a subscriber L node 536 (having a bandwidth percentage of 50%).

FIG. 5B illustrates a hierarchy tree 501 that includes two levels: (1) a tunnel level and (2) a subscriber level. As shown, the hierarchy tree 501 includes a root 540 that includes a number of children nodes at a tunnel level. In particular, the root 540 includes a tunnel A node 542 (having a bandwidth percentage of 50%) and a tunnel B node 544 (having a bandwidth percentage of 50%). The tunnel A node 542 includes a number of children nodes (that are leaf nodes of the hierarchy tree 501) at a subscriber level. In particular, the tunnel A node 542 includes a subscriber A node 546 (having a bandwidth percentage of 25%), a subscriber B node 548 (having a bandwidth percentage of 25%), a subscriber C node 550 (having a bandwidth percentage of 25%) and a subscriber D node 552 (having a bandwidth percentage of 25%). The tunnel B node 544 includes a number of children nodes (that are leaf nodes of the hierarchy tree 501) at the subscriber level. In particular, the tunnel B node 544 includes a subscriber E node 554 (having a bandwidth percentage of 33⅓%), a subscriber F node 558 (having a bandwidth percentage of 33⅓) and a subscriber G node 556 (having a bandwidth percentage of 33⅓%).

FIG. 5C illustrates a hierarchy tree 503 that includes two levels: (1) a context level and (2) a subscriber level. As shown, the hierarchy tree 503 includes a root 570 that includes a number of children nodes at a context level. In particular, the root 570 includes a context A node 572 (having a bandwidth percentage of 33⅓%), a context B node 574 (having a bandwidth percentage of 33⅓%) and a context C node 576 (having a bandwidth percentage of 33⅓%). The context A node 572 includes a number of children nodes (that are leaf nodes of the hierarchy tree 503) at a subscriber level. In particular, the context A node 572 includes a subscriber A node 577 (having a bandwidth percentage of 25%), a subscriber B node 578 (having a bandwidth percentage of 25%), a subscriber C node 579 (having a bandwidth percentage of 25%) and a subscriber D node 580 (having a bandwidth percentage of 25%). The context B node 574 includes a number of children nodes (that are leaf nodes of the hierarchy tree 503) at the subscriber level. In particular, the context B node 574 includes a subscriber E node 581 (having a bandwidth percentage of 33⅓%), a subscriber F node 582 (having a bandwidth percentage of 33⅓%) and a subscriber G node 583 (having a bandwidth percentage of 33⅓%). The context C node 576 includes a number of children nodes (that are leaf nodes of the hierarchy tree 503) at the subscriber level. In particular, the context C node 576 includes a subscriber H node 583 (having a bandwidth percentage of 25%), a subscriber I node 584 (having a bandwidth percentage of 25%), a subscriber J node 585 (having a bandwidth percentage of 25%) and a subscriber K node 586 (having a bandwidth percentage of 25%). The hierarchy trees illustrated in FIGS. 5A-5C are by way of example and not by way of limitation, as embodiments of the invention can incorporate hierarchy trees having a lesser and/or greater number of levels. Further, embodiments of the invention can incorporate levels having attributes that are different from those illustrated in FIGS. 5A-5C. For example, in one embodiment, a hierarchy tree could include a context level and a tunnel level. In another embodiment, a hierarchy tree could include a tunnel level and an interface level (related to the interface that the packet is received).

Using the hierarchy tree 500 of FIG. 5A and returning to the flow diagram 400 of FIG. 4, to help illustrate the locating of the node within the port tree at the highest level associated with the received packet, assume that the data packet is received into an ingress port of the traffic card 250A. The data packet is transmitted to the forwarding card 200, wherein the forwarding engine 202 determines that the data packet is to be outputted on the egress port 254A of the traffic card 250N (based on routing tables within the forwarding card 200 (not shown)). Accordingly, the forwarding engine 202 retrieves the port tree 206 associated with the egress port 254A from the memory 220.

Further, the forwarding engine 202 begins traversal of the hierarchy tree 500 at the root 502. The forwarding engine 202 checks the nodes at the level below the root 502 (the highest level) and locates the node at this level associated with the packet. In this example, the packets being received are associated with a context (such as an Internet Service Provider, etc.) In one embodiment, based on the egress circuit and/or tunnel, the forwarding engine 202 can retrieve attributes associated with the packet including the context. Returning to the example, the forwarding engine 202 compares the context of the packet to context A of the node 504. If the two contexts match, the forwarding engine 202 has located the node within the port tree at the highest level associated with the received packet. Conversely, if the two contexts do not match, the forwarding engine 202 checks a different node at the highest level. Accordingly, the forwarding engine 202 compares the context of the packet to the context B of the node 506. The forwarding engine 202 continues this traversal and comparison of the nodes at the highest level until a match is made with the context of the packet. Control continues at block 406.

In block 406, a determination is made on whether the located node is a non-leaf node of the hierarchy tree being traversed. With reference to the exemplary embodiment of FIG. 2, the forwarding engine 202 makes this determination. In one embodiment, the forwarding engine 202 makes this determination based on an attribute for this node identifying such node as a leaf or non-leaf node. In another embodiment, the forwarding engine 202 makes this determination based on whether the located node has any children nodes.

In block 408, upon determining that the node is a non-leaf node, the node within the port tree at the next level associated with the received packet is located. With reference to the exemplary embodiment of FIG. 2, the forwarding engine 202 locates the node within the port tree 206 at the level (below the level at a node was previously located) associated with the received packet.

Using the hierarchy tree 500 of FIG. 5A to help illustrate the locating of the node within the port tree at the next level associated with the received packet, assume that the prior level wherein a node was located was the context level. Accordingly, the forwarding engine 202 continues traversal of the hierarchy tree 500 at the tunnel level. The forwarding engine 202 locates the node at this level associated with the packet. In this example, the packets being received are associated with a tunnel that the packets are being transmitted through across the network (as discussed above). In one embodiment, the forwarding engine 202 can retrieve attributes associated with the packet including the tunnel. Returning to the example, the forwarding engine 202 compares the tunnel of the packet to tunnel A of the node 508. If the two tunnels match, the forwarding engine 202 has located the node within the port tree at the next level associated with the received packet. Conversely, if the two tunnels do not match, the forwarding engine 202 checks a different node at this level. Accordingly, the forwarding engine 202 compares the tunnel of the packet to the tunnel B of the node 510. The forwarding engine 202 continues this traversal and comparison of the nodes at this level until a match is made with the tunnel of the packet. Control continues at block 406.

As described, the process continues traversing the port tree for this packet until the associated node for the current level is a leaf node. Returning to FIG. 5A to help illustrate, the forwarding engine 202 would locate the associated node for the packet at the subscriber level, which would be a leaf node (as such nodes do not have children nodes).

In block 410, upon determining that the located node is a leaf node, a determination is made of whether there are multiple queues associated with this located leaf node. With reference to the exemplary embodiment of FIG. 2, the forwarding engine 202 makes this determination. In one embodiment, a leaf node within a port tree is associated with one to a number of output queues that the packets are to be stored prior to be outputting from the traffic card 250. For example, the output queues 302A-302C are associated with the subscriber A node 516, while the output queues 302D-302H are associated with the subscriber B node 518, while the output queue 302I is associated with the subscriber C node 520, etc.

In block 412, upon determining that there are not multiple queues associated with this located leaf node, the packet is stored in the one queue for this leaf node. With reference to the exemplary embodiment of FIGS. 2 and 3, the forwarding engine 202 stores the packet into this one queue associated with this node for the given port 250/254 for the given traffic card 250 that the data packet is to be output from. The process of the storage of the data packet into the appropriate output queue based on a hierarchy tree is complete.

In block 414, upon determining that there are multiple queues associated with this located leaf node, the queue among the multiple queues for the storage of the packet is determined. With reference to the exemplary embodiment of FIG. 2, the forwarding engine 202 makes this determination. While any of a number of different approaches can be employed in the determination of the queue for the storage of the data packet, in one embodiment, the forwarding engine 202 employs the Stochastic Fair Queuing (SFQ) algorithm for a determination of the queue of the number of queues that the data packet is to be stored. In another embodiment, the forwarding engine 202 determines the queue based on a round robin order. Control continues in block 416.

In block 416, the packet is stored in the determined queue among the multiple queues for the leaf node. With reference to the exemplary embodiment of FIGS. 2 and 3, the forwarding engine 202 stores the packet into this determined queue associated with this leaf node for the given port 250/254 for the given traffic card 250 that the data packet is to be output from. The process of the storage of the data packet into the appropriate output queue based on a hierarchy tree is complete.

Figure 6:
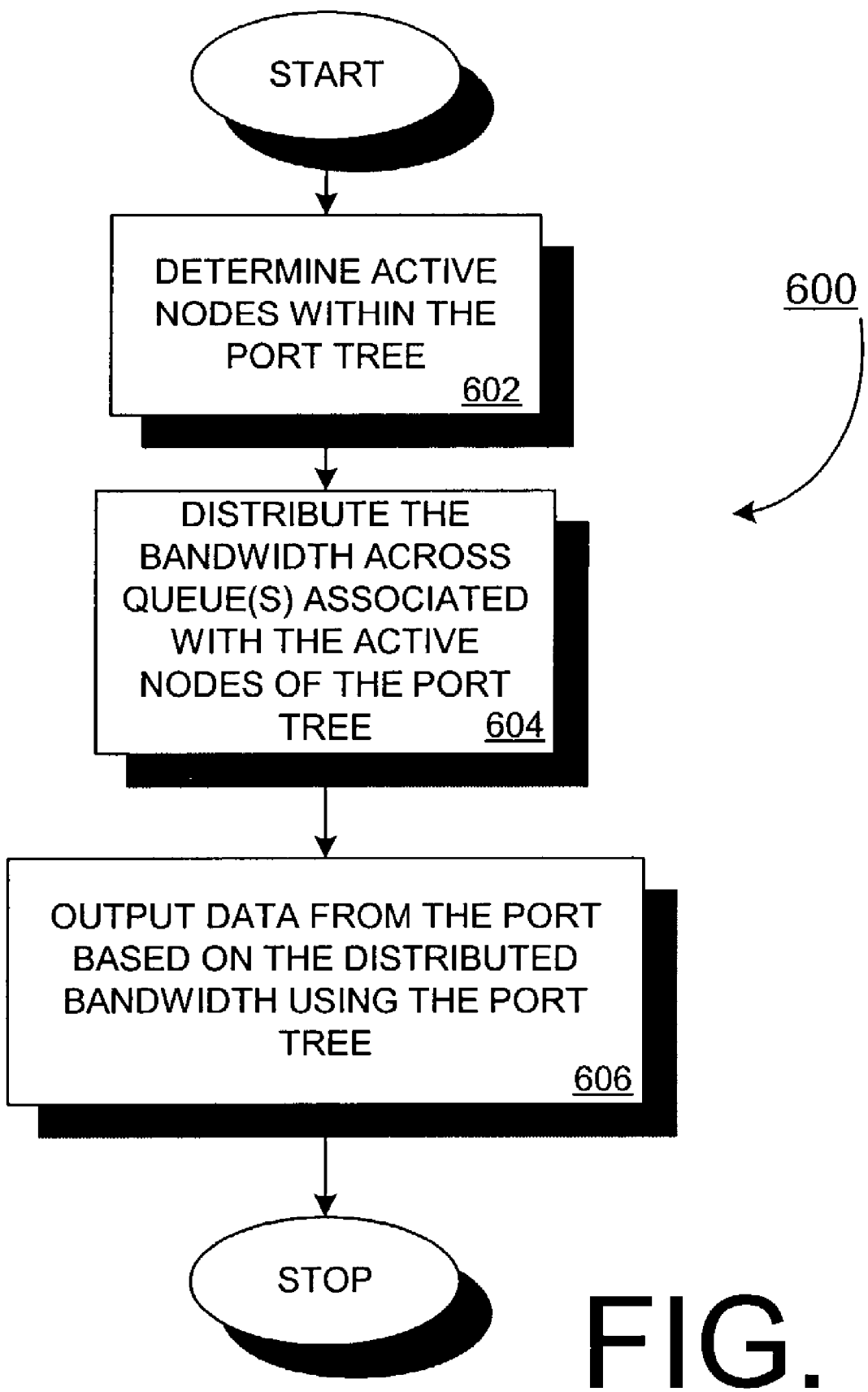
FIG. 6 illustrates a flow diagram for the outputting of data packets from a number of different queues across a number of different ports of a traffic card, according to one embodiment of the invention.

The operations for outputting data packets from a number of different queues across a number of different output ports of a traffic card will now be described. In particular, FIG. 6 illustrates a flow diagram for the outputting of data packets from a number of different queues across a number of different ports of a traffic card, according to one embodiment of the invention. The operation of flow diagram 600 will be described with reference to the exemplary systems shown FIGS. 1-3.

Figure 7A:
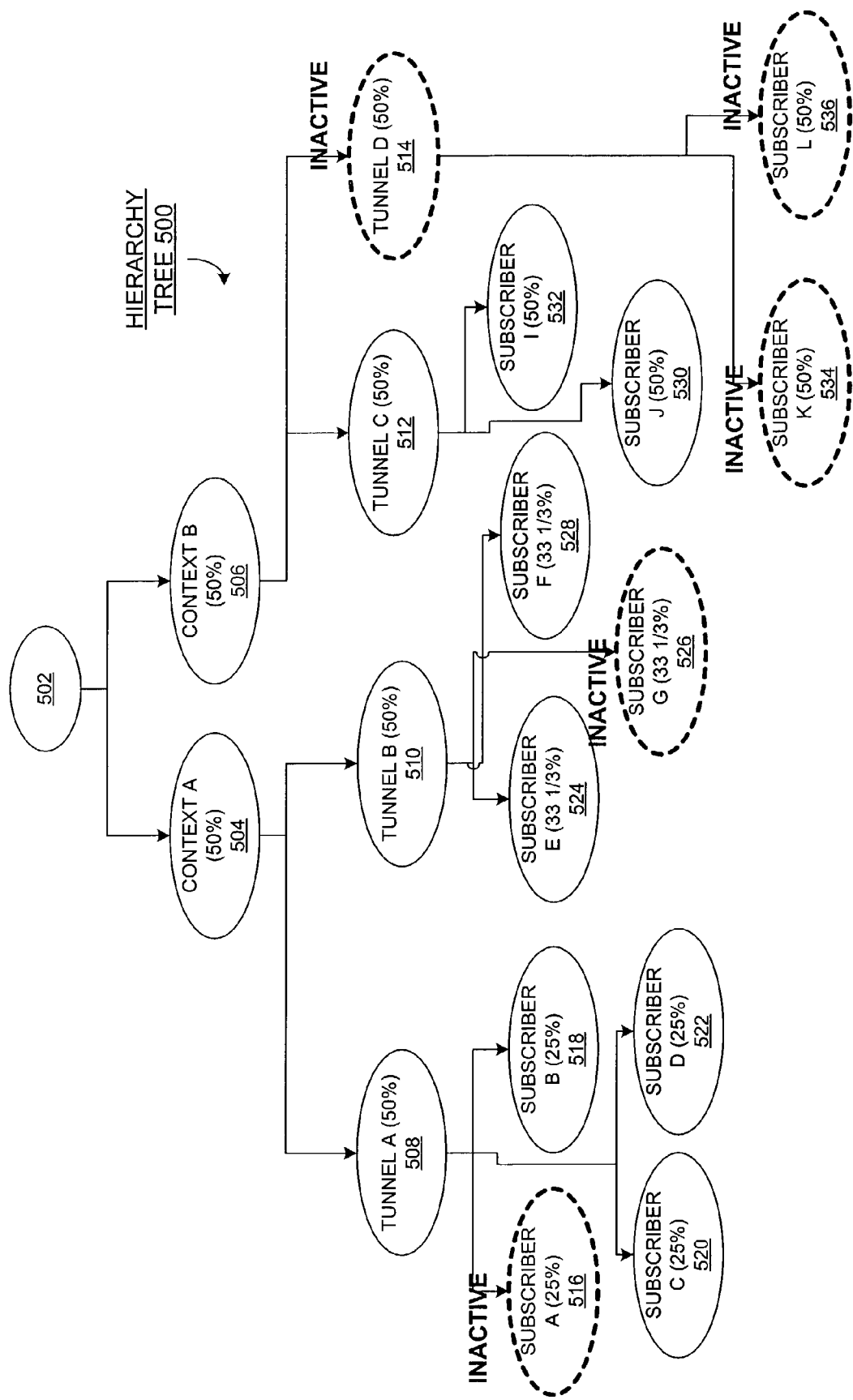
FIG. 7A illustrates a hierarchy tree, having a number of inactive nodes, for quality of service classification for processing of data packets, according to one embodiment of the invention.

In block 602, the active nodes within the port tree are determined. With reference to the exemplary embodiment of FIG. 2, the forwarding engine 202 determines the active nodes within the port tree. To help illustrate, FIG. 7A illustrates a hierarchy tree, having a number of inactive nodes, for quality of service classification for processing of data packets, according to one embodiment of the invention. In particular, FIG. 7A illustrates the hierarchy tree 500 of FIG. 5A, wherein a number of the nodes are inactive. In one embodiment, a node is considered inactive when the associated queue(s) do not have data currently stored therein. As described above, in an embodiment, the hierarchy tree 500 is a data structure having a number of objects that include a number of attributes. Accordingly, in one embodiment, a node within the hierarchy tree 500 is an object that includes an attribute indicating whether the associated queue(s) for this node having data stored therein.

As shown in FIG. 7A, the subscriber A node 516 and the subscriber G node 526 are inactive. Further, the subscriber K node 534 and the subscriber L node 536 are inactive. Because all of the leaf children nodes of the tunnel D node 514 are inactive, the tunnel D node 514 is considered inactive. Therefore, the queue(s) associated with these leaf nodes are not currently storing data packets to be outputted from the associated port for this hierarchy tree.

Returning to FIG. 6 and using the hierarchy tree 500 illustrated in FIG. 7A, the forwarding engine 202 traverses the hierarchy tree 500 and determines that the context A node 504, the context B node 506, the tunnel A node 508, the tunnel B node 510, the tunnel C node 512, the subscriber B node 518, the subscriber C node 520, the subscriber D node 522, the subscriber E node 524, the subscriber F node 528, the subscriber I node 532 and the subscriber J node 530 are active nodes.

In block 604, the bandwidth for the port is distributed across the queues associated with the active nodes of the port tree. With reference to the exemplary embodiment of FIG. 2, the forwarding engine 202 distributes the bandwidth for the port across the queues associated with the active nodes of the port tree. Based on the example illustrated in FIG. 7A, the forwarding engine 202 distributes the bandwidth for the port across the queues associated with that the context A node 504, the context B node 506, the tunnel A node 508, the tunnel B node 510, the tunnel C node 512, the subscriber B node 518, the subscriber C node 520, the subscriber D node 522, the subscriber E node 524, the subscriber F node 528, the subscriber I node 532 and the subscriber J node 530. The distribution of the bandwidth for the port is described in more detail below in conjunction with FIG. 8.

In block 606, the data is outputted from the port based on the distributed bandwidth using the port tree. With reference to the exemplary embodiment of FIG. 2, the forwarding engine 202 outputs the data from the port based on the distributed bandwidth using the port tree. The outputting of the data from the port based on the distributed bandwidth using the port tree is described in more detail below in conjunction with FIGS. 9-11.

Figure 8:
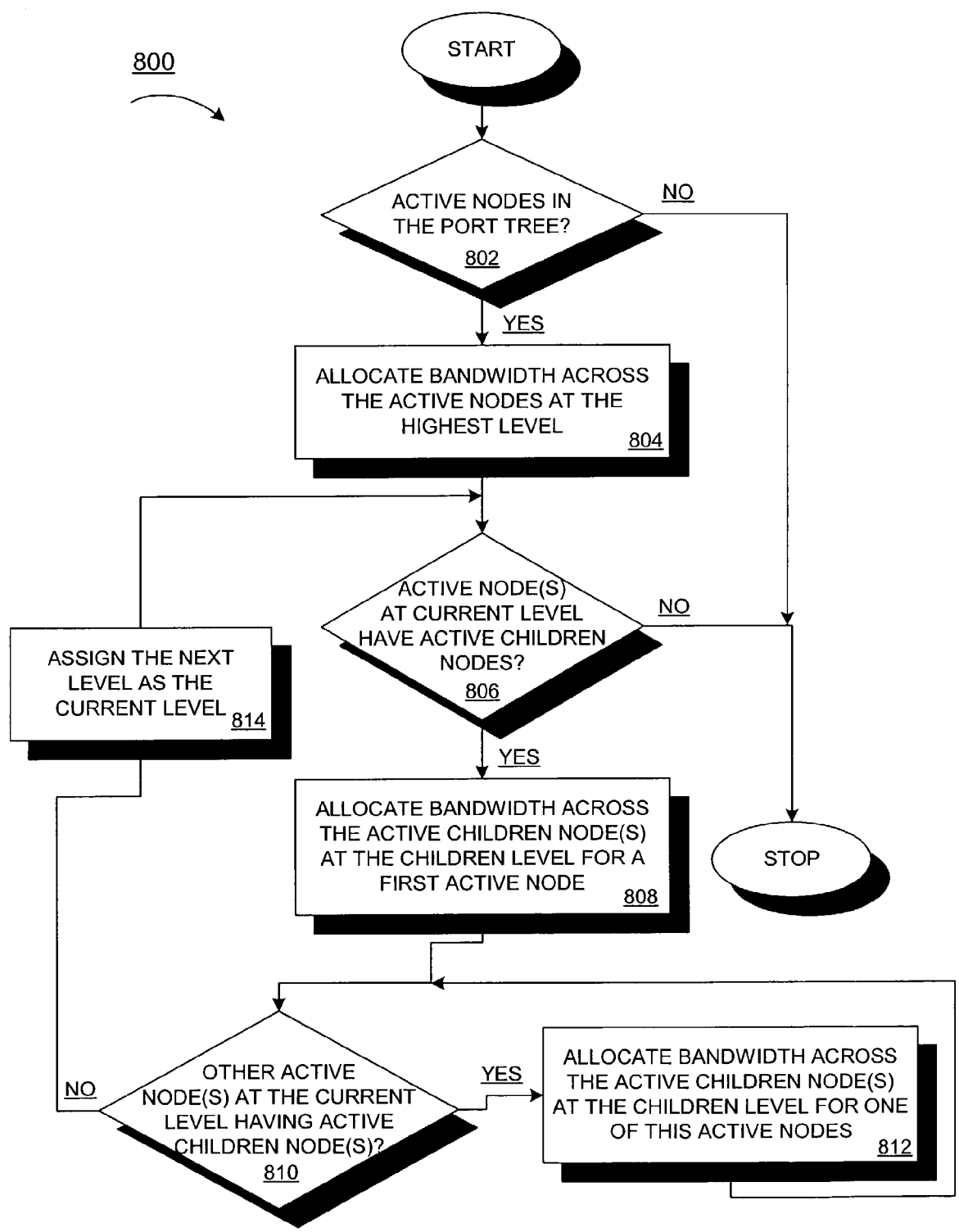
FIG. 8 illustrates a flow diagram for the distribution of the bandwidth for the port based on a hierarchy tree, according to one embodiment of the invention.

The operations for the distribution of the bandwidth for the port will now be described. In particular, FIG. 8 illustrates a flow diagram for the distribution of the bandwidth for the port based on a hierarchy tree, according to one embodiment of the invention. The operation of the flow diagram 800 will be described with reference to the exemplary systems shown FIGS. 1-3.

In block 802, a determination is made on whether there are any active nodes in the port tree for this port. With reference to the exemplary embodiment of FIG. 2, the forwarding engine 202 makes this determination on whether there are any active nodes in the port tree for this port. As described above in conjunction with the operation in block 602 of FIG. 6, the forwarding engine 202 locates the active nodes within the port tree. Accordingly, based on this locating, the forwarding engine 202 makes the determination whether the port tree include any active nodes. For example, in an embodiment, when there are no queues for the port for this port tree that are currently storing data therein, all nodes for this port tree are considered inactive. Upon determining that there are no active nodes in the port tree, the operation of the flow diagram 800 is complete.

In block 804, upon determining that there are active nodes in the port tree, the bandwidth for the current port is allocated across the highest level of the port tree having active node(s). With reference to the exemplary embodiment of FIG. 2, the forwarding engine 202 allocates the bandwidth for the current port across the highest level of the port tree having active node(s).

Figure 7B:
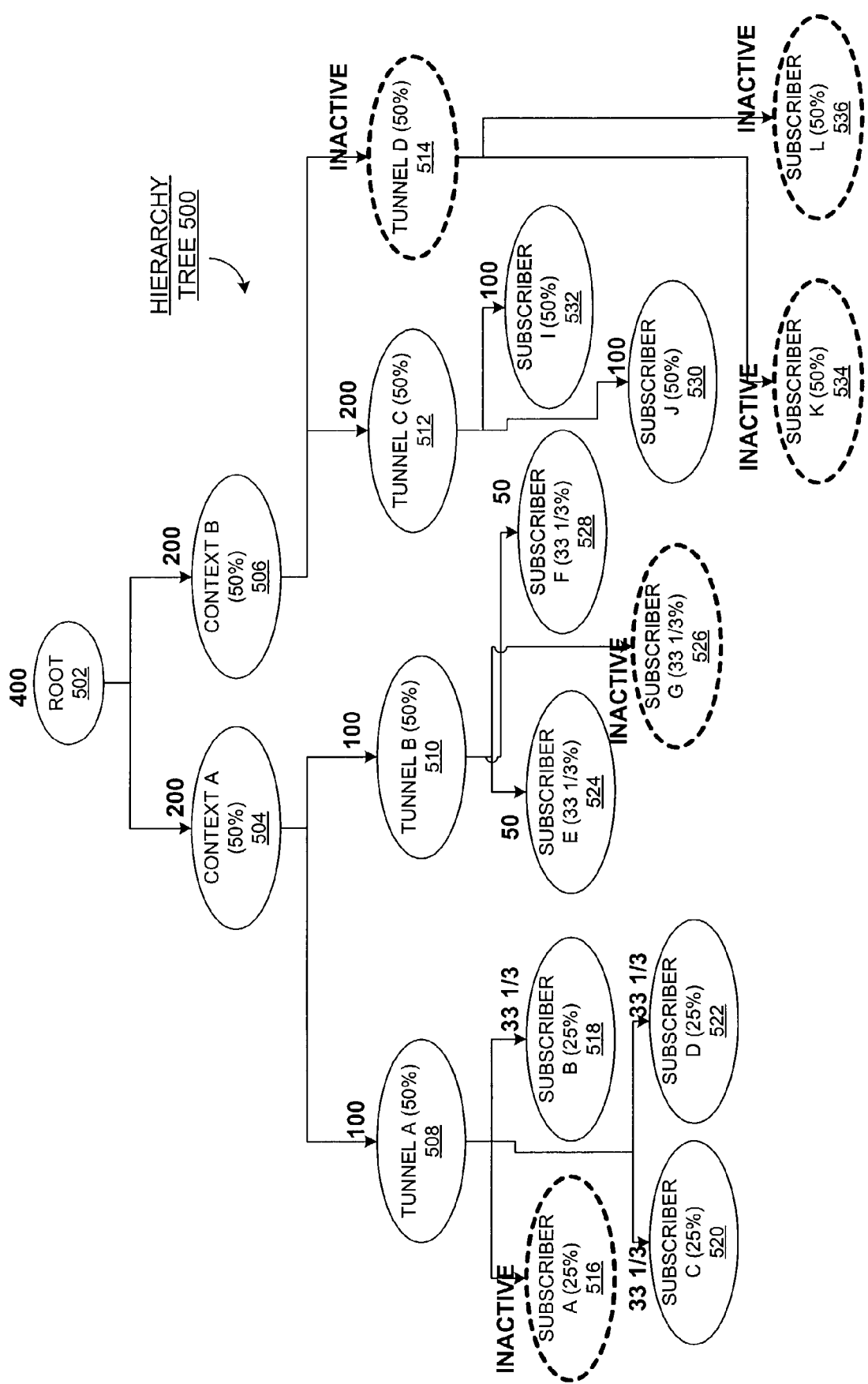
FIG. 7B illustrates a bandwidth distribution across a hierarchy tree for quality of service classification for processing of data packets, according to one embodiment of the invention.

To help illustrate, FIG. 7B illustrates a bandwidth distribution across a hierarchy tree for quality of service classification for processing of data packets, according to one embodiment of the invention. In particular, FIG. 7B illustrates the hierarchy tree 500 of FIG. 7A with a distribution of bandwidth across the different active nodes of the tree. At the root node 502, a value of 400 is available for the associated port for a given cycle. In one embodiment, this value is representative of a number of megabits. This value is distributed to the context level (the highest level). As shown, the context A node 504 and the context B node are each to receive 50% of the bandwidth. Accordingly, a value of 200 is available for the context A node 504, while a value of 200 is available for the context B node 506. Control continues at block 806.

Returning to FIG. 8, in block 806, a determination is made on whether the active node(s) at the current level of the port tree have active children nodes. With reference to the exemplary embodiment of FIG. 2, the forwarding engine 202 makes this determination on whether the active node(s) at the current level of the port tree have active children nodes. Returning to FIG. 7B to help illustrate, the forwarding engine 202 determines whether the context A node 504 and the context B node 506 have children nodes. In this example, the context A node 504 has two children nodes that are active: the tunnel A node 508 and the tunnel B node 510.

Further, the context B node 506 has one child node that is active: the tunnel C node 512.

In block 808, upon determining that the active node(s) at the current level of the port tree do have children nodes that are active, the bandwidth is allocated across the active children node(s) for a first active node at the current level. With reference to the exemplary embodiment of FIG. 2, the forwarding engine 202 allocates the bandwidth across the active children node(s) for a first active node at the current level of the port tree. Returning to FIG. 7B to help illustrate, assume that the context A node 504 is considered the first active node at the current level (the context level). Accordingly, the forwarding engine 202 allocates the bandwidth across the children nodes of node 504: the tunnel A node 508 and the tunnel B node 510. As shown, the tunnel A node 508 and the tunnel B node 510 are each to receive 50% of the bandwidth allocated to its parent node: context A node 504. Therefore, the forwarding engine 202 assigns a value of 100 to both the tunnel A node 508 and the tunnel B node 510. Control continues at block 810.

In block 810, a determination is made on whether other active nodes at the current level of the port tree have active children nodes. With reference to the exemplary embodiment of FIG. 2, the forwarding engine 202 determines whether other active nodes at the current level of the port tree have active children nodes. Returning to FIG. 7B to help illustrate, the forwarding engine 202 determines whether the context level includes other active nodes that have active children nodes. In this example, the forwarding engine 202 determines that the context B node 506 has one active child node: the tunnel C node 512.

In block 812, upon determining that other active nodes at the current level of the port tree have active children nodes, bandwidth is allocated across the active children node(s) for one of these active nodes at the current level. Returning to the exemplary embodiment of FIG. 2, the forwarding engine 202 allocates the bandwidth across the active children node(s) for one of these active children nodes at the current level. Returning to FIG. 7B to help illustrate, the forwarding engine 202 allocates the bandwidth across the active child node for the context B node 506: the tunnel C node 512. As shown, even though the tunnel C node 512 is to receive 50% of the bandwidth allocated to its parent node (the context B node 506), the forwarding engine 202 allocates the entire bandwidth (200) to the tunnel C node 512 because the other children nodes are inactive. Control continues at block 810. This recursive operation of determining whether other active nodes at the current level of the port tree have active children nodes as well as the allocation of the bandwidth to such active children nodes continues until the active nodes at the current level have been processed.

In block 814, upon determining that there are no other active nodes at the current level of the port tree that have not been processed, the next level of the port tree is assigned as the current level (for processing). Returning to the exemplary embodiment of FIG. 2, the forwarding engine 202 assigns the next level of the port tree as the current level. Returning to the example shown in FIG. 7B to help illustrate, the forwarding engine 202 assigns the tunnel level as the current level. Control continues at block 806.

Accordingly, the forwarding engine 202 determines whether the active nodes of the current level have active children node(s), as described above. Returning to the example in FIG. 7B to help illustrate, the forwarding engine 202 determines whether the tunnel A node 508, the tunnel B node 510 or the tunnel C node 512 have active children nodes. Based on the operations described in blocks 806-814, the forwarding engine 202 allocates the bandwidth of the tunnel A node 508 to the subscriber B node 518, the subscriber C node 520 and the subscriber D node 522 (each receiving a bandwidth value of 33⅓). This allocated bandwidth value for the nodes 518-522 are greater because the subscriber A node 516 is inactive (does not have data in the associated queues for this node).

Additionally, the forwarding engine 202 allocates the tunnel B node 510 to the subscriber E node 524 and the subscriber F node 528 (each receiving a bandwidth value of 50). This allocated bandwidth value for the nodes 524 and 528 is greater because the subscriber G node 526 is inactive. The forwarding engine 202 allocates the tunnel C node 512 to the subscriber I node 532 and the subscriber J node 530 (each receiving a bandwidth value of 100). This allocated bandwidth value for the nodes 530 and 532 is greater because the children nodes along with the tunnel D node 514 are inactive. As described, the bandwidth for a given port is allocated based on the associated port tree having nodes associated with different attributes of the packets to be outputted. Further, the bandwidth for a given port is allocated such that only the nodes that are active (having queues that have data packets or children nodes that have queues that have data packets) receive bandwidth. Accordingly, the bandwidth for the given port is not unused. In one embodiment, this allocation of the bandwidth is performed each time data packets are to be outputted from the port.

Figure 9:
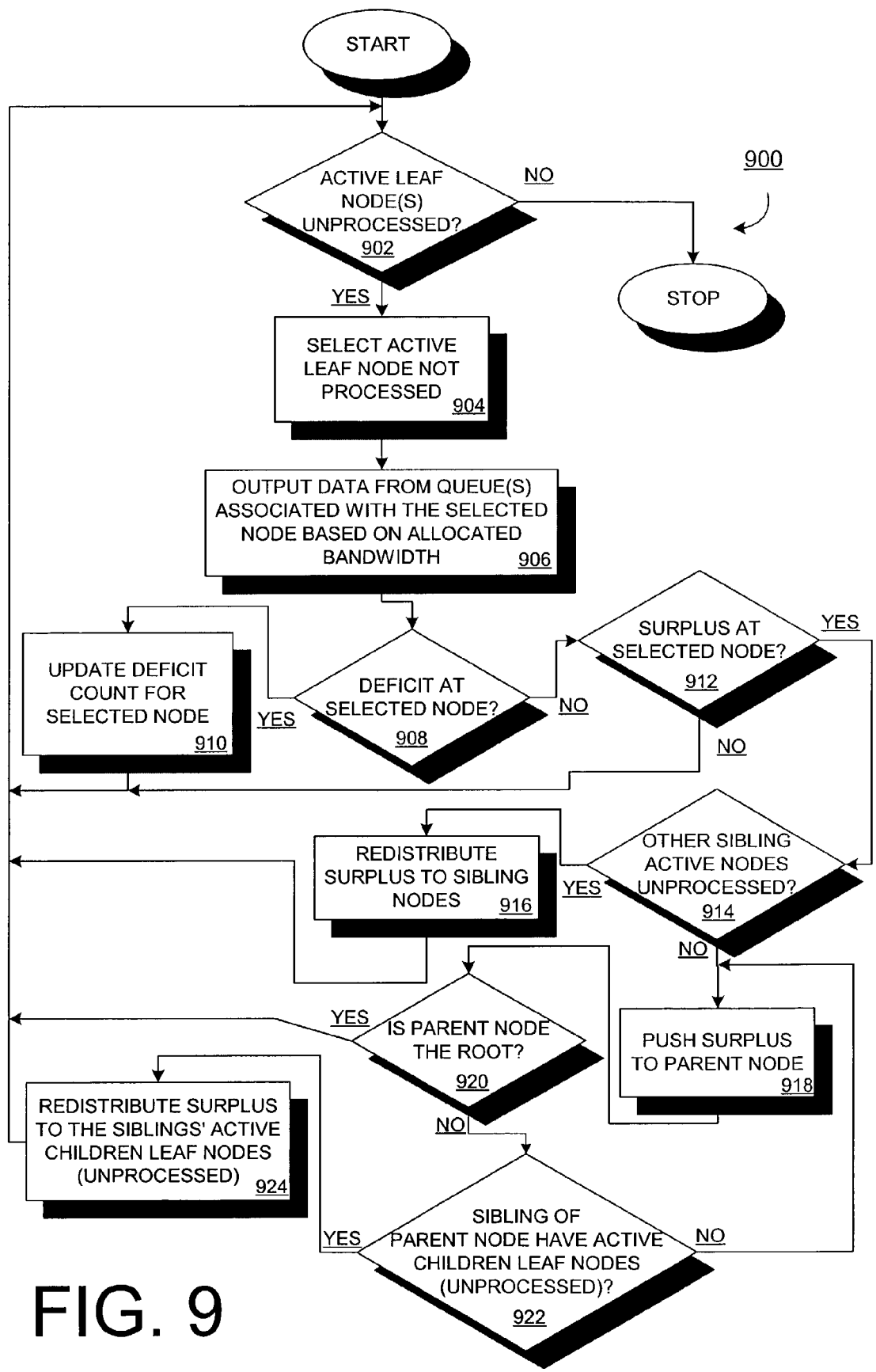
FIG. 9 illustrates a flow diagram for the outputting of data from a given port based on a hierarchy tree of data attributes, according to one embodiment of the invention.

The operations of outputting of data from a given port will now be described. FIG. 9 illustrates a flow diagram for the outputting of data from a given port based on a hierarchy tree of data attributes, according to one embodiment of the invention. The operation of the flow diagram 900 will be described with reference to the exemplary systems shown FIGS. 1-3.

In block 902, a determination made of whether there are active leaf node(s) that are unprocessed for the current cycle. With reference to the exemplary embodiment of FIG. 2, the forwarding engine 202 makes the determination of whether there are active leaf node(s) that are unprocessed for the current cycle. As described above, in an embodiment, the forwarding engine 202 traverses the port tree for the given port to identify the current active nodes within the tree. Accordingly, in an embodiment, the forwarding engine 202 tracks whether active leaf nodes have been processed in a current cycle. Upon determining that there are no active leaf node(s) that are unprocessed for the current cycle, the operations of the flow diagram 900 are complete, thereby completing the outputting of data for a given cycle for a port on a traffic card.

In block 904, upon determining that there are active leaf node(s) that are unprocessed for the current cycle, an active leaf node that has not been processed is selected. With reference to the exemplary embodiment of FIG. 2, the forwarding engine 202 selects an active leaf node that has not been processed. While the selection of an active leaf node (unprocessed) can be in one of a number of different orders of processing of such nodes, in one embodiment, the forwarding engine 202 selects the unprocessed active leaf nodes in an order such that the sibling active leaf nodes are processed sequentially. Returning to FIG. 7B to help illustrate, in one embodiment, the subscriber B node 518, the subscriber C node 520 and the subscriber D node 522 are processed in sequential order. In other embodiments, the order of processing of the active leaf nodes are such that the active leaf nodes with the highest bandwidth are processed first. In another embodiment, the order of processing is based on priority among the nodes of the port tree. One such embodiment is described in more detail below in conjunction with FIGS. 11A-11B. Control continues at block 906.

In block 906, data is outputted from the queue(s) associated with the selected node based on the allocated bandwidth. With reference to the exemplary embodiment of FIG. 2, the forwarding engine 202 outputs data from the queue(s) associated with the selected node based on the allocated bandwidth. As described above, in one embodiment, a given leaf node may have one to a number of queues associated therewith. Accordingly, in one embodiment, the allocated bandwidth for this node is equally distributed across the associated queues. Returning to FIG. 7B to help illustrate, assume that the subscriber J node 530 has 10 associated output queues. In such an embodiment, each output queue outputs 1/10 of the 100. Therefore, if the value of 100 is representative of the number of megabits, each output queue for the subscriber J node 530 outputs 10 megabits for this given cycle. Control continues in block 908.

In block 908, a determination is made on whether there is a deficit at the selected node. With reference to the exemplary embodiment of FIG. 2, the forwarding engine 202 makes the determination on whether there is a deficit at the selected node. The operations of make this determination is described in more detail below in conjunction with the description of block 910.

In block 910, upon determining that there is a deficit at the selected node from one to a number of queues during the outputting of data, a deficit count for the selected node is updated to reflect the deficit. With reference to the exemplary embodiment of FIG. 2, the forwarding engine 202 updates the deficit count for the selected node to reflect the deficit of the output queues associated with the selected node.

Figure 10:
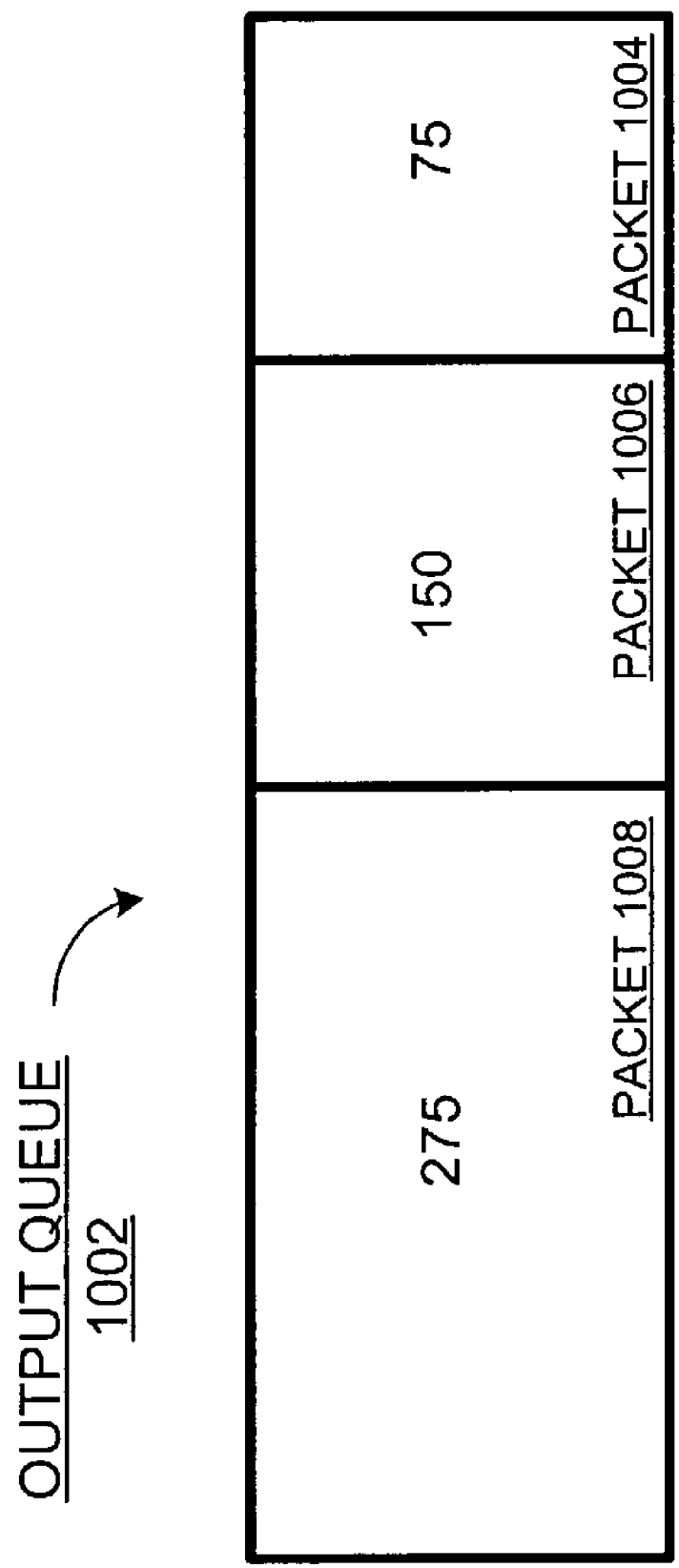
FIG. 10 illustrates an output queue storing a number of packets, according to one embodiment of the invention.

To help illustrate, FIG. 10 illustrates an output queue storing a number of packets, according to one embodiment of the invention. As shown, FIG. 10 illustrates an output queue 1002 that includes packets of varying size. Beginning from the top, the output queue 1002 includes a packet 1004 having a size of 75, a packet 1006 having a size of 150 and a packet 1008 having a size of 275.

Returning to FIG. 7B to help illustrate the output of packets from the output queue 1002, assume that the output queue 1002 is associated with the subscriber I node 532. Accordingly, the output queue 1002 will have a bandwidth value of 100 (assuming that the output queue 1002 is the only output queue associated with the subscriber I node 532). In operation, the forwarding engine 202 would output the packet that has a size of 75, thereby leaving a bandwidth value of 25. The next packet (the packet 1006) has a size of 150. Accordingly, there is not enough available bandwidth in the current cycle to output the packet 1006. Therefore, the output queue 1002 has a deficit of 25, as a bandwidth value of 25 is unused.

In the subsequent cycle of operation, the available bandwidth includes the deficit bandwidth of 25 and the distributed bandwidth for the current cycle (100), thereby totaling a bandwidth value of 125. However, the size of the packet 1006 is 150. Accordingly, the forwarding engine 202 does not output the packet 1006 because of the insufficiently distributed bandwidth for the output queue 1002. Therefore, the forwarding engine 202 updates the deficit count for the output queue 1002 such that the deficit is 125.

In the subsequent cycle of operation, the available bandwidth includes the deficit bandwidth of 125 and the distributed bandwidth for the current cycle (100), thereby totaling a bandwidth value of 225. Accordingly, the forwarding engine 202 outputs the packet 1006 (having a size of 150), leaving a bandwidth value of 75. The next packet (the packet 1008) has a size of 275. Therefore, there is not enough bandwidth in the current cycle to output the packet 1008. Moreover, the forwarding engine 202 updates the deficit count for the output queue 1002, such that the deficit is 75. This determination of whether the output queues for a node has a deficit for a current cycle and the updating of the deficit count continues across subsequent cycles. Returning to the flow diagram 900, assuming that there is a deficit, the control continues at block 902, where the determination is made regarding whether active leaf node(s) remain to be processed.

In block 912, upon determining that there is not a deficit at the selected node from one of the number of queues during the outputting of data, a determination is made on whether there is a surplus at the selected node. With reference to the exemplary embodiment of FIG. 2, the forwarding engine 202 makes the determination of whether there is a surplus at the selected node. In an embodiment, a surplus is defined as that quantity of unused bandwidth that was allocated to the node for the given cycle. Returning to FIG. 7B to help illustrate, assume that the queues associated with the subscriber I node 532 only include data equaling 20 of the allocated 100. For example, assume that the queues associated with the subscriber I node 532 have been allocated 100 megabits but that such queues only include 20 megabits. Accordingly, the subscriber I node 532 has a surplus of 80. Upon determining that the selected node does not include a surplus, the control continues at block 902, where the determination is made regarding whether active leaf node(s) remain to be processed.

In block 914, upon determining that the selected node does include a surplus, a determination is made of whether other sibling active nodes of the currently selected node are unprocessed. With reference to the exemplary embodiment of FIG. 2, the forwarding engine 202 makes the determination of whether other sibling active nodes of the currently selected node are unprocessed. Returning to FIG. 7B to help illustrate, assume that the subscriber B node 518 is the selected node and that subscriber C node 520 and the subscriber D node 522 have not been selected to be processed in the current cycle of outputting data from this port. Accordingly, the subscriber B node 518 includes sibling nodes that are active and not yet processed in the current cycle: the subscriber C node 520 and the subscriber D node 522.

In block 916, upon determining that the selected node does include other sibling active nodes that are unprocessed, the surplus is redistributed to these sibling nodes. With reference to the exemplary embodiment of FIG. 2, the forwarding engine 202 redistributes the surplus to these sibling nodes. While this distribution can be performed a number of different ways, in one embodiment, the forwarding engine 202 distributes the surplus equally across the associated queues of these sibling nodes. In other embodiments, a type of prioritization among the different sibling nodes could allow for a different distribution (such as all or greater portion is distributed to the queues of the sibling nodes having a higher priority). Control continues at block 902, where the determination is made regarding whether active leaf node(s) remain to be processed.

In block 918, upon determining that the selected node does not include other sibling active nodes that are unprocessed, the surplus is pushed to the parent node. With reference to the exemplary embodiment of FIG. 2, the forwarding engine 202 pushes the surplus to the parent node. Returning to FIG. 7B to help illustrate, assume that the subscriber D node 522 has a surplus of bandwidth of 10 during the given cycle and that the subscriber B node 518 and the subscriber C node 520 have been processed. Accordingly, the forwarding engine 202 pushes the unused bandwidth of 10 up to the parent node: the tunnel A node 508. Control continues at block 920.

In block 920, a determination is made of whether the parent node (where the surplus is pushed) is the root node of the port tree. With reference to the exemplary embodiment of FIG. 2, the forwarding engine 202 makes the determination of whether the parent node (where the surplus is pushed) is the root node of the port tree. Returning to FIG. 7B to help illustrate, if the context A node 504 is the current parent node to which the surplus has been pushed and the context B node 506 has been determined not to have active children leaf nodes that are unprocessed (which is determine in block 922, which is described in more detail below), the surplus is pushed to the root node 502. Accordingly, if the surplus reaches the root node 502, all of the active leaf nodes have been processed for the given cycle for this port. Therefore, the surplus from a given active leaf node cannot be redistributed for this given cycle. Upon determining that the parent node (where the surplus has been pushed) is the root node of the port tree, the control continues at block 902, where the determination is made regarding whether active leaf node(s) remain to be processed. In this situation, the determination would indicate that all of the active leaf node(s) have been processed, thereby completing the outputting of data from the port for this given cycle.

In block 922, upon determining that the parent node (where the surplus has been pushed) is not the root node of the port tree, a determination is made of whether the siblings of the parent node have active children leaf nodes that are unprocessed. With reference to the exemplary embodiment of FIG. 2, the forwarding engine 202 makes the determination of whether the siblings of the parent node have active children leaf nodes that are unprocessed. Returning to FIG. 7B to help illustrate, assume that a surplus of 50 has been pushed back to the tunnel A node 508. The forwarding engine 202 would determine whether the active sibling nodes of the tunnel A node 508 (the tunnel B node 510 and the tunnel C node 512) have active children leaf nodes that are unprocessed. In this example, the forwarding engine 202 would determine that the subscriber E node 524, the subscriber F node 528 are active children leaf nodes for the tunnel B node 510, while the subscriber I node 532 and the subscriber J node 530 are active children leaf nodes for the tunnel C node 512. Accordingly, the forwarding engine 202 would determine if any of the associated queues for the subscriber E node 524, the subscriber F node 528, the subscriber I node 532 or the subscriber J node 530 are unprocessed in the current cycle of outputting data from this given port.

In block 924, upon determining that the siblings of the parent node have active children leaf nodes that are unprocessed, the surplus is redistributed to these siblings' active leaf children nodes that are unprocessed. While a number of different approaches can be employed in the redistribution of this surplus to the active leaf children nodes of the siblings of the parent that are unprocessed, in one embodiment, the surplus is distributed equally across the different active leaf children nodes. Returning to the example being described for block 922 above, assume that there is a surplus of 40 and that the subscriber E node 524, the subscriber F node 528, the subscriber I node 532 and the subscriber J node 530 are unprocessed. Accordingly, the queues for each of the nodes 524, 528, 532 and 530 receive an additional bandwidth of 10. However, embodiments of the invention are not limited to such an equal distribution of the surplus. In other embodiments, a type of prioritization among the different sibling nodes could allow for a different distribution (such as all or greater portion being distributed to the queues of the sibling nodes having a higher priority). Control continues at block 902, where the determination is made regarding whether active leaf node(s) remain to be processed. Upon determining that the siblings of the parent node do not have active children leaf nodes that are unprocessed, control continues in block 918 where the surplus is pushed to the parent node. Accordingly, as described, embodiments of the invention allow for the redistribution of the unused bandwidth for queues of a given node to other queues of other nodes within the port tree, thereby allowing for greater usage of the bandwidth for a given cycle.

Figure 11A:
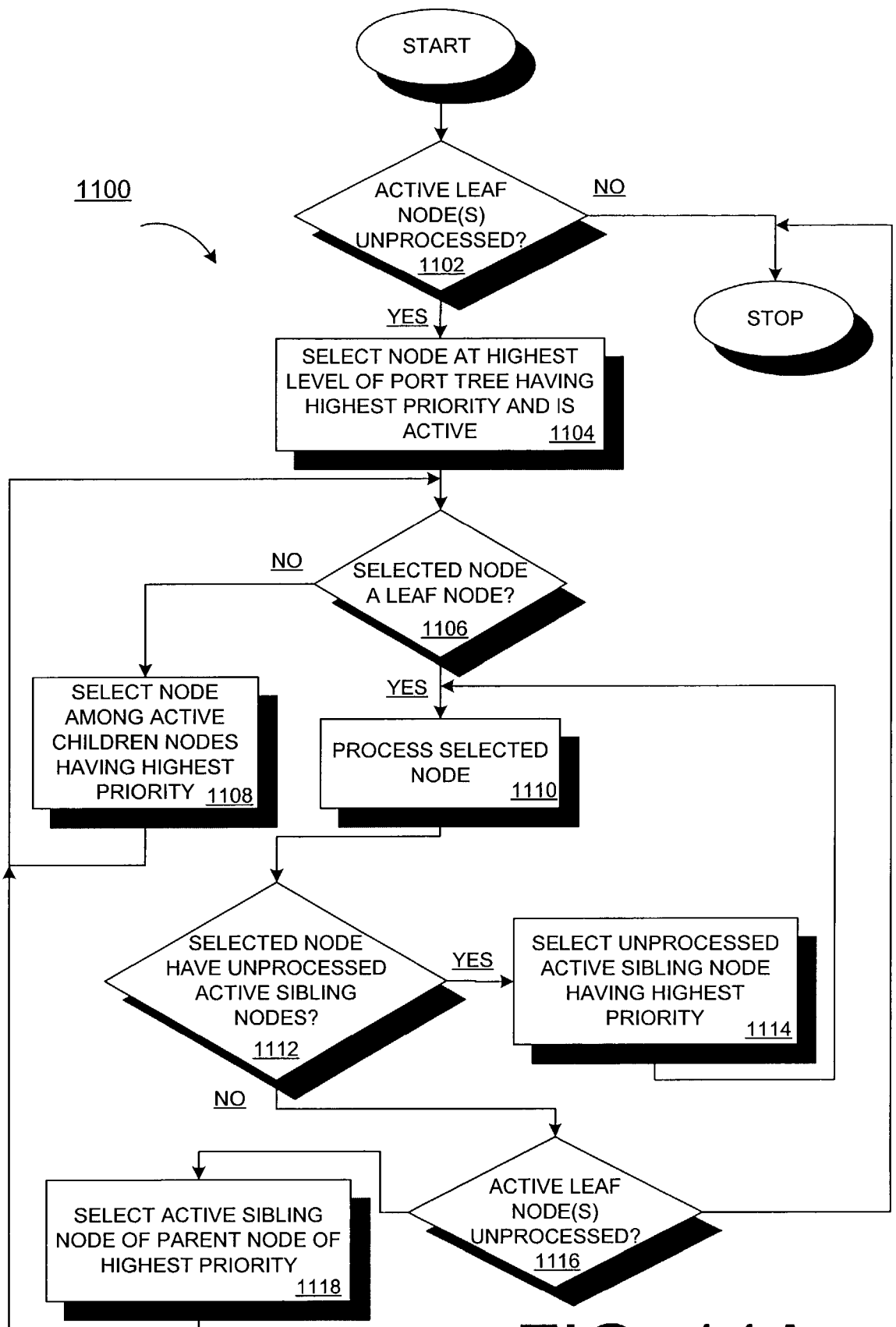
FIGS. 11A-11B illustrate flow diagrams for the outputting of data from a given port based on a hierarchy tree of data attributes, according to another embodiment of the invention.
Figure 11B:
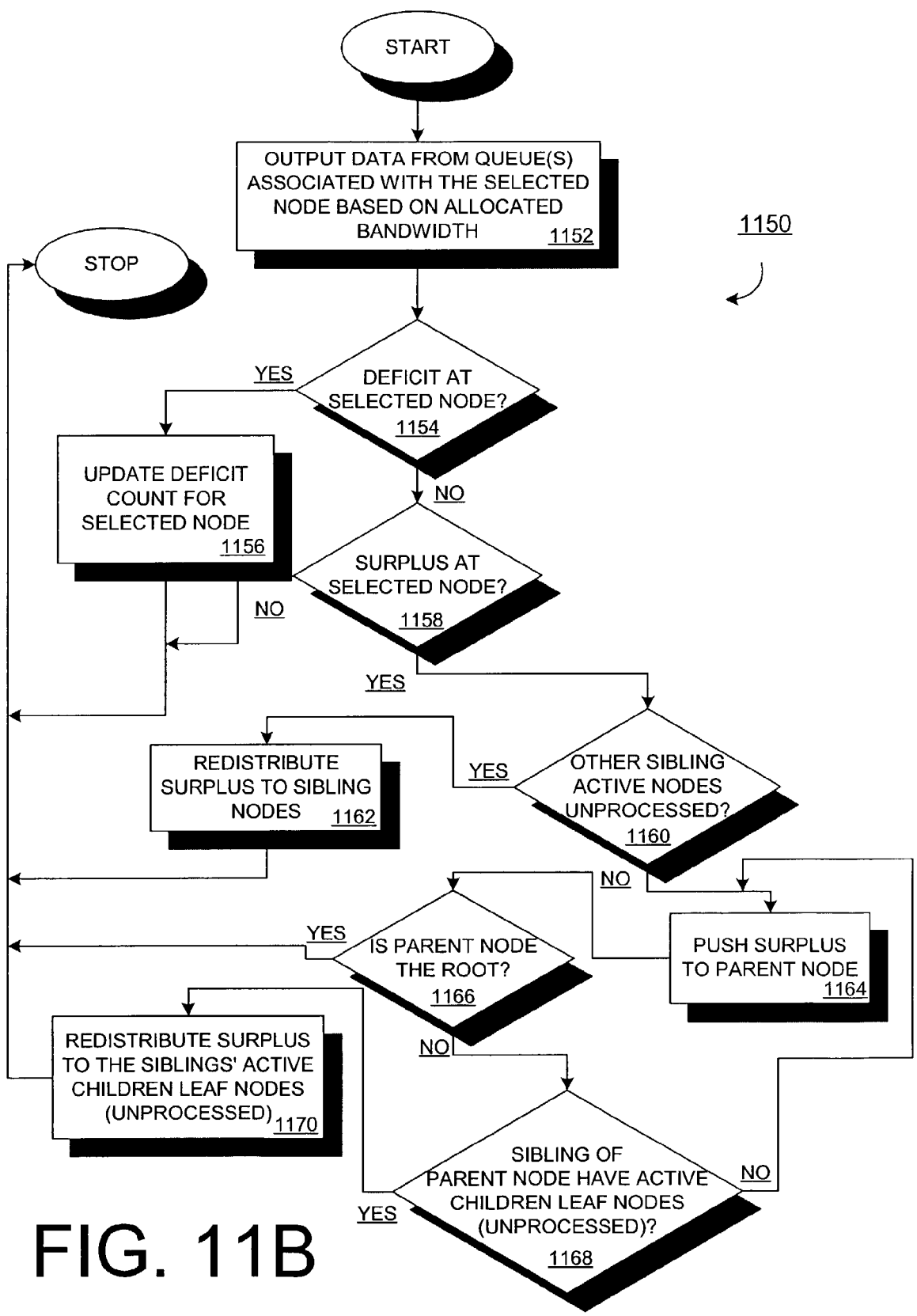

A different embodiment for the operations of outputting of data from a given port will now be described. FIGS. 11A-11B illustrate flow diagrams for the outputting of data from a given port based on a hierarchy tree of data attributes, according to another embodiment of the invention. The operation of the flow diagrams 1100 and 1150 will be described with reference to the exemplary systems shown FIGS. 1-3. As will be described in more detail below, the flow diagram 1150 illustrates a more detailed operation of the block 1110 within the flow diagram 1100.

In block 1102, a determination made of whether there are active leaf node(s) that are unprocessed for the current cycle. With reference to the exemplary embodiment of FIG. 2, the forwarding engine 202 makes the determination of whether there are active leaf node(s) that are unprocessed for the current cycle. As described above, in an embodiment, the forwarding engine 202 traverses the port tree for the given port to identify the current active nodes within the tree. Accordingly, in an embodiment, the forwarding engine 202 tracks whether active leaf nodes have been processed in a current cycle. Upon determining that there are no active leaf node(s) that are unprocessed for the current cycle, the operations of the flow diagram 1100 are complete, thereby completing the outputting of data for a given cycle for a port on a traffic card.

In block 1104, upon determining that there are active leaf nodes that are unprocessed for the current cycle, a node at the highest level of the port tree having the highest priority and is active is selected. With reference to the exemplary embodiment of FIG. 2, the forwarding engine 202 selects the node at the highest level of the port tree having the highest priority and which is active. As described above, in one embodiment, the nodes of the port tree include a number of attributes. In one embodiment, an attribute representing the priority level for the node is associated with nodes of the port tree. In an embodiment, this priority level/value represents a priority with reference to the other nodes at a given level. Returning to FIG. 7B to help illustrate, the tunnel A node 508 would have a value that is representative of a priority with reference to the tunnel B node 510, the tunnel C node 512 and the tunnel D node 514. For example, the tunnel A node 508 could have a value of two; the tunnel B node 510 could have a value of one; the tunnel C node 512 could have a value of four; and the tunnel D node 512 could have a value of three. Accordingly, the order of priority would be as follows: the tunnel B node 510, the tunnel A node 508, the tunnel D node 514 and the tunnel C node 512. However, embodiments of the invention are not so limited. For example, in another embodiment, the nodes of the port tree could be assigned a priority value relative to all other nodes in the port tree. Control continues at block 1106.

In block 1106, a determination is made of whether the selected node is a leaf node. With reference to the exemplary embodiment of FIG. 2, the forwarding engine 202 makes the determination of whether the selected node is a leaf node. As described above, in one embodiment, the forwarding engine 202 determines whether the selected node is a leaf node based on whether the selected node has children nodes.

In block 1108, upon determining that the selected node is not a leaf node, a node is selected among the active children nodes (of the selected node) having the highest priority. With reference to the exemplary embodiment of FIG. 2, the forwarding engine 202 selects the node among the active children nodes (of the selected node) having the highest priority. This recursive operation of selection of a node continues until the selected node is a leaf node. Returning to FIG. 7B to help illustrate, assume that the context A node 504 has a higher priority than the context B node 506. Because the context A node is a non-leaf node, a selection is made between the tunnel A node 508 and the tunnel B node 510. Assuming that the tunnel A node 508 has a higher priority and because the tunnel A node 508 is a non-leaf node, a selection is made (based on highest priority) among the subscriber B node 518, the subscriber C node 520 and the subscriber D node 522 (one of which is the selected leaf node).

In block 1110, upon determining that the selected node is a leaf node, the selected node is processed. With reference to the exemplary embodiment of FIG. 2, the forwarding engine 202 processes the selected node. The operations of processing the selected node are described in more detail below in conjunction with FIG. 11B. Control continues at block 1112.

In block 1112, a determination is made of whether the selected node has unprocessed active sibling nodes. With reference to the exemplary embodiment of FIG. 2, the forwarding engine 202 determines whether the selected node has unprocessed active sibling nodes. Returning to FIG. 7B to help illustrate, assume that the subscriber B node 518 is the selected node and that subscriber C node 520 and the subscriber D node 522 have not been selected to be processed in the current cycle of outputting data from this port. Accordingly, the subscriber B node 518 includes sibling nodes that are active and not yet processed in the current cycle: the subscriber C node 520 and the subscriber D node 522.

In block 1114, upon determining that the selected node has unprocessed active sibling nodes, the unprocessed active sibling node having the highest priority is selected. With reference to the exemplary embodiment of FIG. 2, the forwarding engine 202 selects the unprocessed active sibling node having the highest priority. Returning to the example being described in conjunction with block 1112, assume that the subscriber C node 520 has a higher priority in comparison to the subscriber D node 522. Accordingly, the subscriber C node 520 is selected from among the two nodes. Control continues at block 1110 where the selected node is processed. Therefore, this selection and processing at blocks 1114 and 1110 continues until all of the unprocessed active sibling nodes have been processed.

In block 1116, upon determining that the selected node does not have unprocessed active sibling nodes, a determination is made of whether there are active leaf node(s) that are unprocessed for the current cycle. With reference to the exemplary embodiment of FIG. 2, the forwarding engine 202 makes the determination of whether there are active leaf node(s) that are unprocessed for the current cycle. As described above, in an embodiment, the forwarding engine 202 traverses the port tree for the given port to identify the current active nodes within the tree. Accordingly, in an embodiment, the forwarding engine 202 tracks whether active leaf nodes have been processed in a current cycle. Upon determining that there are no active leaf node(s) that are unprocessed for the current cycle, the operations of the flow diagram 1100 are complete, thereby completing the outputting of data for a given cycle for a port on a traffic card.

In block 1118, upon determining that there are active leaf nodes that are unprocessed for the current cycle, the active sibling node of the parent node of highest priority (that is unprocessed) is selected. With reference to the exemplary embodiment of FIG. 2, the forwarding engine 202 selects the active sibling node of the parent node of highest priority (that is unprocessed). Returning to the example being described in blocks 1112 and 1114 in conjunction with FIG. 7B to help illustrate, the tunnel A node 508 is the parent node. Assume that the tunnel B node 510 and the tunnel C node 512 are unprocessed. Accordingly, the node between the tunnel B node 510 and the tunnel C node 512 having the highest priority is selected. Control continues at block 1106 where a determination is made of whether the selected node is a leaf node.

Therefore, as described, the queues associated with the active leaf nodes of the port tree are processed in an order that is based on a priority across the different nodes of the port tree. Such embodiments allow for queues of higher priority to be processed first in comparison to queues of lower priority for a given cycle of outputting data from queues of a given port.

A more detailed flow diagram of the operations associated with processing of selected nodes at block 1110 of FIG. 11A will now be described. In particular, FIG. 11B illustrates a flow diagram for processing of selected nodes, according to one embodiment of the invention.

In block 1152, data is outputted from the queue(s) associated with the selected node based on the allocated bandwidth. With reference to the exemplary embodiment of FIG. 2, the forwarding engine 202 outputs data from the queue(s) associated with the selected node based on the allocated bandwidth. As described above, in one embodiment, a given leaf node may have one to a number of queues associated therewith. Accordingly, in one embodiment, the allocated bandwidth for this node is equally distributed across the associated queues. Returning to FIG. 7B to help illustrate, assume that the subscriber J node 530 has 10 associated output queues. In such an embodiment, each output queue outputs 1/10 of the 100. Therefore, if the value of 100 is representative of the number of megabits, each output queue for the subscriber J node 530 outputs 10 megabits for this given cycle. Control continues in block 1154.

In block 1154, a determination is made on whether there is a deficit at the selected node. With reference to the exemplary embodiment of FIG. 2, the forwarding engine 202 makes the determination on whether there is a deficit at the selected node. A more detailed description of this determination is set forth above in conjunction with block 908 of FIG. 9.

In block 1156, upon determining that there is a deficit at the selected node from one to a number of queues during the outputting of data, a deficit count for the selected node is updated to reflect the deficit. With reference to the exemplary embodiment of FIG. 2, the forwarding engine 202 updates a deficit count for the output queues associated with the selected nodes to reflect the deficit. A more detailed description of this updating of a deficit count is set forth above in conjunction with block 910 of FIG. 9. The control continues such that the operations of the flow diagram 1150 are complete.

In block 1158, upon determining that there is not a deficit at the selected node from one of the number of queues during the outputting of data, a determination is made on whether there is a surplus at the selected node. With reference to the exemplary embodiment of FIG. 2, the forwarding engine 202 makes the determination of whether there is a surplus at the selected node. In an embodiment, a surplus is defined as that quantity of unused bandwidth that was allocated to the node for the given cycle. Returning to FIG. 7B to help illustrate, assume that the queues associated with the subscriber I node 532 only include data equaling 20 of the allocated 100. For example, assume that the queues associated with the subscriber I node 532 have been allocated 100 megabits but that such queues only include 20 megabits. Accordingly, the subscriber I node 532 has a surplus of 80.

In block 1160, upon determining that the selected node does include a surplus, a determination is made of whether other sibling active nodes of the currently selected node are unprocessed. With referenced to the exemplary embodiment of FIG. 2, the forwarding engine 202 makes the determination of whether other sibling active nodes of the currently selected node are unprocessed. Returning to FIG. 7B to help illustrate, assume that the subscriber B node 518 is the selected node and that subscriber C node 520 and the subscriber D node 522 have not been selected to be processed in the current cycle of outputting data from this port. Accordingly, the subscriber B node 518 includes sibling nodes that are active and not yet processed in the current cycle: the subscriber C node 520 and the subscriber D node 522.

In block 1162, upon determining that the selected node does include other sibling active nodes that are unprocessed, the surplus is redistributed to these sibling nodes. With reference to the exemplary embodiment of FIG. 2, the forwarding engine 202 redistributes the surplus to these sibling nodes. While this distribution can be performed a number of different ways, in one embodiment, the forwarding engine 202 distributes the surplus equally across the associated queues of these sibling nodes. In other embodiments, a type of prioritization among the different sibling nodes could allow for a different distribution (such as all or greater portion being distributed to the queues of the sibling nodes having a higher priority). The control continues such that the operations of the flow diagram 1150 are complete.

In block 1164, upon determining that the selected node does not include other sibling active nodes that are unprocessed, the surplus is pushed to the parent node. With reference to the exemplary embodiment of FIG. 2, the forwarding engine 202 pushes the surplus to the parent node. Returning to FIG. 7B to help illustrate, assume that the subscriber D node 522 has a surplus of bandwidth of 10 during the given cycle and that the subscriber B node 518 and the subscriber C node 520 have been processed. Accordingly, the forwarding engine 202 pushes the unused bandwidth of 10 up to the parent node: the tunnel A node 508. Control continues at block 1166.

In block 1166, a determination is made of whether the parent node (where the surplus is pushed) is the root node of the port tree. With reference to the exemplary embodiment of FIG. 2, the forwarding engine 202 makes the determination of whether the parent node (where the surplus is pushed) the root node of the port tree. Returning to FIG. 7B to help illustrate, if the context A node 504 is the current parent node to which the surplus has been pushed and the context B node 506 has been determined not to have active children leaf nodes that are unprocessed (which is determine in block 1168, which is described in more detail below), the surplus is pushed to the root node 502. Accordingly, if the surplus reaches the root node 502, all of the active leaf nodes have been processed for the given cycle for this port. Therefore, the surplus from a given active leaf node cannot be redistributed for this given cycle. Upon determining that the parent node (where the surplus has been pushed) is the root node of the port tree, the control continues such that the operations of the flow diagram 1150 are complete.

In block 1168, upon determining that the parent node (where the surplus has been pushed) is not the root node of the port tree, a determination is made of whether the siblings of the parent node have active children leaf nodes that are unprocessed. With reference to the exemplary embodiment of FIG. 2, the forwarding engine 202 makes the determination of whether the siblings of the parent node have active children leaf nodes that are unprocessed. Returning to FIG. 7B to help illustrate, assume that a surplus of 50 has been pushed back to the tunnel A node 508. The forwarding engine 202 would determine whether the active sibling nodes of the tunnel A node 508 (the tunnel B node 510 and the tunnel C node 512) have active children leaf nodes that are unprocessed. In this example, the forwarding engine 202 would determine that the subscriber E node 524, the subscriber F node 528 are active children leaf nodes for the tunnel B node 510, while the subscriber I node 532 and the subscriber J node 530 are active children leaf nodes for the tunnel C node 512. Accordingly, the forwarding engine 202 would determine if any of the associated queues for the subscriber E node 524, the subscriber F node 528, the subscriber I node 532 or the subscriber J node 530 are unprocessed in the current cycle of outputting data from this given port.

In block 1170, upon determining that the siblings of the parent node have active children leaf nodes that are unprocessed, the surplus is redistributed to these siblings' active leaf children nodes that are unprocessed. While a number of different approaches can be employed in the redistribution of this surplus to the active leaf children nodes of the siblings of the parent that are unprocessed, in one embodiment, the surplus is distributed equally across the different active leaf children nodes. Returning to the example being described for block 1168 above, assume that there is a surplus of 40 and that the subscriber E node 524, the subscriber F node 528, the subscriber I node 532 and the subscriber J node 530 are unprocessed. Accordingly, the queues for each of the nodes 524, 528, 532 and 530 receive an additional bandwidth of 10. However, embodiments of the invention are not limited to such an equal distribution of the surplus. In other embodiments, a type of prioritization among the different sibling nodes could allow for a different distribution (such as all or greater portion being distributed to the queues of the sibling nodes having a higher priority). The control continues such that the operations of the flow diagram 1150 are complete.

Upon determining that the siblings of the parent node do not have active children leaf nodes that are unprocessed, control continues in block 1164 where the surplus is pushed to the parent node. Accordingly, as described, embodiments of the invention allow for the redistribution of the unused bandwidth for queues of a given node to other queues of other nodes within the port tree, thereby allowing for greater usage of the bandwidth for a given cycle.

The servers as well as the traffic cards, forwarding cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for surplus redistribution for quality of service classification for packet processing have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   outputting data from a queue of a number of queues of an egress port, the queue having a portion of an allocated bandwidth for the egress port for a processing cycle, wherein the number of queues are associated with nodes of a port tree,
   wherein the nodes of the port tree are within different levels, wherein the port tree includes a first level having nodes associated with different contexts for the data, a second level having nodes associated with different tunnels that the data traverses, and a third level having nodes associated with different subscribers; and
   redistributing surplus of the portion of bandwidth for the queue that is not used to at least one other queue, the surplus added to a portion of the allocated bandwidth for the at least one other queue for the processing cycle.

2. The method of claim 1, comprising outputting data from the at least one other queue based on the surplus added to the portion of the allocated bandwidth for the at least one other queue for the processing cycle.

3. The method of claim 1, wherein the redistributing the surplus of the portion of the bandwidth for the queue that is not used to at least one other queue comprises redistributing the surplus of the portion of the bandwidth for the queue that is not used to a different queue that is also associated with a same node that queue is associated.

4. The method of claim 1, wherein the redistributing the surplus of the portion of the bandwidth for the queue that is not used to at least one other queue comprises redistributing the surplus of the portion of the bandwidth for the queue that is not used to a queue that is associated with a sibling node of a node that the queue is associated.

5. The method of claim 1, wherein the redistributing the surplus of the portion of the bandwidth for the queue that is not used to at least one other queue comprises,
   pushing the surplus to a parent node of a node of the queue,
   redistributing the surplus to a child node of the parent node having queues that are unprocessed in the processing cycle.

6. A method comprising:
   outputting data of packets from a queue of a number of queues of an egress port, wherein the queue is associated with a leaf node of a port tree having a number of levels, wherein a first level of the number of levels includes a number of nodes, each of the number of nodes associated with a different context for packets stored in the number of queues, wherein a second level of the number of levels includes a number of nodes, each of the number of nodes at the second level associated with a different tunnel that the data traverses, wherein a third level of the number of levels includes a number of nodes, each of the number of nodes at the third level associated with different subscribers; and wherein each node of the port tree includes an allocated bandwidth, the queue having a portion of an allocated bandwidth for the egress port for a processing cycle; and
   recursively pushing a surplus of the allocated bandwidth for the queue that is not used during the outputting of the data for the processing cycle to a parent node of the queue until a leaf node of the parent node has associated queues that are unprocessed in the processing cycle;
   redistributing the surplus to the leaf nodes of the parent node having associated queues that are unprocessed in the processing cycle; and
   outputting data of packets from the associated queues of the leaf nodes based on the allocated bandwidth for the associated queues and the redistributed surplus to the associated queues.

7. The method of claim 6 comprising updating a deficit count for a leaf node of the port tree for the processing cycle, upon determining that queues associated with the leaf node have packets stored and the allocated bandwidth for the queues can not be used.

8. A network element comprising:
   a traffic card that includes an egress port, the egress port to include a number of egress queues to store a number of data packets,
   wherein the number of queues are each associated with a node of a port tree, wherein the nodes of the port tree are within different levels, wherein the port tree includes a first level having nodes associated with different contexts for the data, a second level having nodes associated with different tunnels that the data traverses, and a third level having nodes associated with different subscribers; and
   a forwarding card that includes,
      a memory to store a port tree having a context level of nodes, wherein each node at the context level is associated with a different context for the number of data packets; and
      a forwarding engine to output data packets from the number of egress queues based on a bandwidth for the egress port, the bandwidth allocated across the different egress queues based on the port tree, wherein the forwarding engine is to redistribute a surplus of allocated bandwidth for an egress queue that is not used during a current processing cycle to at least one other queue for the current processing cycle.

9. The network element of claim 8, wherein the forwarding engine is to output data packets from the at least one other queue based on the surplus added to the portion of the allocated bandwidth for the at least one other queue for the current processing cycle.

10. The network element of claim 8, wherein the forwarding engine is to redistribute the surplus of the portion of the bandwidth for the queue tat is not used to a different queue that is also associated with a same node that the queue is associated.

11. The network element of claim 8, wherein the forwarding engine is to redistribute the surplus of the portion of the bandwidth for the queue that is not used to a queue that is associated with a sibling node of a node that the queue is associated.

12. The network element of claim 8, wherein the forwarding engine is to push the surplus to a parent node of a node of the queue, the forwarding engine to redistribute the surplus to a child node of the parent node having queues that are unprocessed in the current processing cycle.

13. A machine-storage medium that provides instructions, which when executed by a machine, cause said machine to perform operations comprising:
   outputting date from a queue of a number of queues of an egress port, the queue having a portion of an allocated bandwidth for the egress port for a processing cycle, wherein the number of queues are associated with nodes of a port tree,
   wherein the nodes of the port tree are within different levels, wherein the port tree includes a first level having nodes associated with different contexts for the data, a second level having nodes associated with different tunnels that the data traverses, and a third level having nodes associated with different subscribers; and
   redistributing surplus of the portion of bandwidth for the queue that is not used to at least one other queue, the surplus added to a portion of the allocated bandwidth for the at least one other queue for the processing cycle.

14. The machine-storage medium of claim 13, comprising outputting data from the at least one other queue based on the surplus added to the portion of the allocated bandwidth for the at least one other queue for the processing cycle.

15. The machine-storage medium of claim 13, wherein the redistributing the surplus of the portion of the bandwidth for the queue that is not used to at least one other queue comprises redistributing the surplus of the portion of the bandwidth for the queue that is not used to a different queue that is also associated with a same node that the queue is associated.

16. The machine-storage medium of claim 13, wherein the redistributing the surplus of the portion of the bandwidth for the queue that is nor used to at least one other queue comprises redistributing the surplus of the portion of the bandwidth for the queue that is not used to a queue that is associated with a sibling node of a node that the queue is associated.

17. The machine-storage medium of claim 13, wherein the redistributing the surplus of the portion of the bandwidth for the queue that is not used to at least one other queue comprises,
   pushing the surplus to a parent node of a node of the queue,
   redistributing the surplus to a child node of the parent node having queues that are unprocessed in the processing cycle.

18. A machine-storage medium that provides instructions, which when executed by a machine, cause said machine to perform operations comprising:
   outputting data of packets from a queue of a number of queues of an egress port, wherein the queue is associated with a leaf node of a port tree having a number of levels, wherein a first level of the number of levels includes a number of nodes, each of the number of nodes associated with a different context for packets stored in the number of queues and wherein each node of the port tree includes an allocated bandwidth, the queue having a portion of an allocated bandwidth for the egress port for a processing cycle; and
   recursively pushing a surplus of the allocated bandwidth for the queue that is not used daring the outputting of the data for the processing cycle to a parent node of the queue until a leaf node of the parent node has associated queues that are unprocessed in the processing cycle;
   redistributing the surplus to the leaf nodes of the parent node having associated queues that are unprocessed in the processing cycle; and
   outputting data of packets from the associated queues of the leaf nodes based on the allocated bandwidth for the associated queues and the redistributed surplus to the associated queues.

19. The machine-storage medium of claim 18 comprising updating a deficit count for a leaf node of the port tree for the processing cycle, upon determining that queues associated with the leaf node have packets stored and the allocated bandwidth for the queues can not be used.

* * * * *